(12) United States Patent
Kataoka et al.

(10) Patent No.: US 7,015,259 B2
(45) Date of Patent: Mar. 21, 2006

(54) CLEAR INK COMPOSITION, INK SET, AND METHOD FOR PRODUCING INKJET RECORD

(75) Inventors: Shuich Kataoka, Nagano (JP); Kiyohiko Takemoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 240 days.

(21) Appl. No.: 10/386,396

(22) Filed: Mar. 11, 2003

(65) Prior Publication Data

US 2004/0092621 A1    May 13, 2004

(30) Foreign Application Priority Data

| Mar. 13, 2002 | (JP) | ............... 2002-069124 |
| Mar. 15, 2002 | (JP) | ............... 2002-073166 |
| Mar. 19, 2002 | (JP) | ............... 2002-077366 |
| Mar. 29, 2002 | (JP) | ............... 2002-097671 |
| Mar. 29, 2002 | (JP) | ............... 2002-097672 |
| Mar. 29, 2002 | (JP) | ............... 2002-097673 |
| Mar. 29, 2002 | (JP) | ............... 2002-097674 |

(51) Int. Cl.
 *C09D 11/10* (2006.01)
 *C08L 33/02* (2006.01)
 *C08L 81/00* (2006.01)
 *C08L 39/00* (2006.01)
 *B41J 2/01* (2006.01)

(52) U.S. Cl. ............. 523/160; 524/521; 524/522; 347/98

(58) Field of Classification Search ........... 523/160, 523/161; 106/31.13; 347/98, 100, 101; 524/555, 556, 609
See application file for complete search history.

(56) References Cited

U.S. PATENT DOCUMENTS

| 6,001,913 | A  | * | 12/1999 | Thames et al. ............ 524/398 |
| 6,152,999 | A  | * | 11/2000 | Erdtmann et al. ......... 106/31.6 |
| 6,204,307 | B1 | * | 3/2001  | Miyabayashi ............. 523/160 |
| 6,368,397 | B1 | * | 4/2002  | Ichizawa et al. ......... 106/31.65 |
| 6,536,890 | B1 | * | 3/2003  | Kato et al. ................. 347/100 |
| 2003/0069329 | A1 | * | 4/2003 | Kubota et al. ............ 523/160 |
| 2004/0030001 | A1 | * | 2/2004 | Ma et al. .................... 523/160 |
| 2004/0032473 | A1 | * | 2/2004 | Ishimoto et al. ........... 347/100 |
| 2004/0063808 | A1 | * | 4/2004 | Ma et al. .................... 523/160 |

FOREIGN PATENT DOCUMENTS

| EP | 1022151 A1 | * | 7/2000 |
| EP | 1145865 A2 | * | 10/2001 |
| EP | 1148104 A1 | * | 10/2001 |
| WO | WO 2002/087886 A1 | * | 11/2002 |

* cited by examiner

*Primary Examiner*—Callie Shosho
(74) *Attorney, Agent, or Firm*—Ladas & Parry LLP

(57) ABSTRACT

High-quality images that have excellent coloring properties and glossiness in the recorded images can be obtained by depositing a colorant-containing color ink composition and a clear ink composition containing water and cationic resin, but no colorant on a recording medium to form a record. The cationic resin is preferably a polyethyleneimine with a weight-average molecular weight (Mw) of 100,000 or less.

49 Claims, No Drawings

CLEAR INK COMPOSITION, INK SET, AND METHOD FOR PRODUCING INKJET RECORD

BACKGROUND OF THE INVENTION

1. Field of the Invention

The present invention relates to a clear ink composition, an ink cartridge, an ink set, a method for producing an inkjet record, and a record, and more particularly to a clear ink composition or the like that has excellent storage properties and can provide a record whose recorded images have excellent coloring properties and glossiness.

2. Description of the Related Art

Inkjet recording is a printing method in which droplets of an ink composition are sprayed and deposited on paper or another recording medium to perform recording. This method is characterized in that sharp images having high resolution can be rapidly printed using a relatively inexpensive device.

In conventional practice, numerous proposals have been made concerning the ink compositions designed for use in records made by this inkjet recording method.

The need for higher-quality recorded images has become more urgent in recent years, and various measures have therefore been implemented in order to further improve the coloring properties and glossiness of such recorded images.

Various measures have also been implemented in order to improve the storage properties of ink compositions.

An ink composition that has adequate storage properties and is also adequate in terms of the coloring properties and glossiness of recorded images has yet to be provided, however.

For example, adding polyethyleneimine to a water-base pigment ink has been proposed in Japanese Patent Application Laid-open Nos. H6-329964, H10-36726, H10-60352, and elsewhere, but this approach is still disadvantageous in that the recorded images have inadequate coloring properties and glossiness, and the ink composition has inadequate storage properties.

Thus, techniques in which additives are introduced into colorant-containing ink compositions to formulate the desired ink compositions are disadvantageous in that the coloring properties and glossiness of recorded images vary with variations in the amount in which the ink compositions are deposited on the recording medium, as well as with the type, amount, and other attributes of the colorants contained in the ink compositions, making it impossible to obtain excellent coloring properties or uniform glossiness.

Another drawback of the techniques for formulating such ink compositions is the inability to improve glossiness in low-duty portions and in non-print portions not covered by these ink compositions.

In addition, improving coloring properties and glossiness together with the storage properties (storage stability) of an ink composition is important for forming high-quality images.

Consequently, an object of the present invention is to provide a highly storable ink composition capable of providing a record whose recorded images have excellent coloring properties and glossiness, and also to provide an ink cartridge, an ink set, a method for producing an inkjet record, and a record.

SUMMARY OF THE INVENTION

As a result of painstaking research, the inventors discovered that a record whose recorded images have excellent glossiness, coloring properties, and storage stability can be obtained by using a clear ink composition that comprises water and cationic resin, but no colorant.

Specifically, the clear ink composition of the present invention comprises water and cationic resin, but no colorant.

As a result of painstaking research, the inventors also discovered that a record in which the recorded images have excellent glossiness, coloring properties, and storage stability, and, in particular, in which excellent glossiness can be provided to the non-print portions or low-duty portions of recorded images, can be obtained by using a clear ink composition that comprises water, cationic resin, and fine polymer particles but is free of any colorants.

Specifically, the clear ink composition of the present invention comprises water, cationic resin, and fine polymer particles but is free of any colorants.

As a result of painstaking research, the inventors further discovered that an excellent record in which the glossiness in the non-print portions or low-duty portions of recorded images is markedly improved can be obtained by using fine polymer particles that form an emulsion in a clear ink composition and have an average particle diameter of 70 nm or greater.

Specifically, the fine polymer particles preferably form an emulsion in a clear ink composition and have an average particle diameter of 70 nm or greater.

As a result of painstaking research, the inventors additionally discovered that an excellent record in which the glossiness in the non-print portions or low-duty portions of recorded images is markedly improved can be obtained by using fine polymer particles that form an emulsion in a clear ink composition and have an average particle diameter of 70 nm or less.

Specifically, the fine polymer particles preferably form an emulsion in a clear ink composition and have an average particle diameter of 70 nm or less.

The ink cartridge of the present invention holds the aforementioned clear ink composition.

The method for producing an inkjet record of the present invention comprises depositing the aforementioned clear ink composition and a colorant-containing color ink composition on a recording medium to perform recording.

A record whose recorded images have excellent glossiness, coloring properties, and storage stability can be obtained using such record producing methods.

In addition, the ink set of the present invention comprises the aforementioned clear ink composition and at least a yellow ink composition, a magenta ink composition, and a cyan ink composition.

DESCRIPTION OF THE PREFERRED EMBODIMENTS

The present invention is described below in greater detail, but the present invention is not limited by this description.

(Clear Ink Composition)

Preferred embodiments of the clear ink composition of the present invention will now be described.

The clear ink composition of the present invention comprises water and cationic resin, but no colorant.

Recorded images with excellent coloring properties, glossiness, and storage stability can be obtained by depositing the clear ink composition of the present invention and a colorant-containing ink composition on a recording medium to form a record. In particular, a clear ink composition can be used for printing on non-print portions and low-duty portions based on a color ink composition, and the glossiness of the non-print portions and low-duty portions can be enhanced when specialty paper is used. In addition, the color ink composition can be uniformly deposited and the coloring properties enhanced by using the clear ink composition of the present invention for printing. In particular, reproducibility can be markedly improved because white spots can be prevented and low lightness/high color saturation can be ensured on specialty paper. The pigment content of a color ink or the weight of the color ink deposited on plain paper can be reduced because of improved color reproducibility. Consequently, improved glossiness on specialty paper and enhanced coloring on plain paper can be concurrently ensured by using the clear ink composition of the present invention. In addition, the clear ink composition of the present invention has excellent storage properties.

The clear ink composition of the present invention may also contain water, cationic resin, and fine polymer particles, but no colorant.

Recorded images with even better glossiness, coloring properties, and storage stability can be obtained by depositing the clear ink composition of the present invention and a colorant-containing ink composition on a recording medium to form a record. In particular, the glossiness of a color ink on specialty paper can be markedly improved, as can the glossiness of non-print portions or low-duty portions based on a color ink composition. In addition, color reproducibility can be markedly improved because the color ink composition can be uniformly deposited, coloring properties can be markedly improved, and white spots can be prevented or low lightness/high color saturation can be ensured on plain paper.

The fine polymer particles preferably form an emulsion and undergo colloidal dispersion in the clear ink composition. Specifically, the fine polymer particles are preferably added to the clear ink composition in the form of an emulsion.

Higher-quality recorded images can be obtained because the transparency of the clear ink composition can be enhanced by causing the fine polymer particles to form an emulsion and to undergo colloidal dispersion in the clear ink composition.

The fine polymer particles form an emulsion in the clear ink composition, and preferably have an average particle diameter of 70 nm or greater, and more preferably no less than 100 nm but no greater than 150 nm. When the diameter of this fine polymer particles is within this range, the fine polymer particles can form an emulsion in water with greater ease, and higher-quality recorded images can be obtained.

The fine polymer particles in the clear ink composition disperse into a milky white emulsion when the fine polymer particles in the clear ink composition have such specific physical properties. It was learned that using a clear ink composition that comprises water, cationic resin, and fine polymer particles with specific physical properties makes it possible to markedly improve glossiness in the non-print portions or low-duty portions of recorded images and to obtain an excellent print.

The glass transition temperature (Tg; measured according to JIS K6900) of the fine polymer particles is preferably 20° C. or less, and more preferably 10° C. or less, from the standpoint of improved stability of recorded images and improved glossiness.

The minimum film formation temperature (MFT) of the fine polymer particles is preferably 20° C. or less, and more preferably 0° C. or less, from the standpoint of improved stability of recorded images and improved glossiness. When the minimum film formation temperature (MFT) of the fine polymer particles is within this range, an even more remarkable effect is obtained in terms of improved glossiness in the non-print portions or low-duty portions of recorded images.

The weight-average molecular weight (Mw) of the fine polymer particles is preferably no less than 100,000 but no greater than 1,000,000, and more preferably no less than 400,000 but no greater than 600,000, from the standpoint of improved stability of recorded images and improved glossiness. When the weight-average molecular weight (Mw) of the fine polymer particles is within this range, an even more remarkable effect is obtained in terms of improved glossiness in the non-print portions or low-duty portions of recorded images.

The content (in terms of solids content) of the fine polymer particles in the clear ink composition is preferably no less than 0.1 wt % but no greater than 5.0 wt %, and more preferably no less than 0.1 wt % but no greater than 2.0 wt %, from the standpoint of improved stability of recorded images and improved glossiness.

A single type of fine polymer particles may be added, or two or more types thereof may be mixed together and added. When such particles are mixed together and added, their total content in the ink composition is preferably no less than 0.1 wt % but no greater than 5.0 wt % (and more preferably no less than 0.1 wt % but no greater than 2.0 wt %).

In particular, a remarkable effect is obtained in terms of improved glossiness in the non-print portions or low-duty portions of recorded images if the fine polymer particles form an emulsion in the clear ink composition and have an average particle diameter of 70 nm or greater, a glass transition temperature (Tg; measured according to JIS K6900) of 20° C. or less, a minimum film formation temperature (MFT) of 20° C. or less, and a weight-average molecular weight (Mw) of no less than 100,000 but no greater than 1,000,000, and if the content of the cationic resin as polyethyleneimine in the ink composition is no less than 0.1 wt % but no greater than 30.0 wt %.

Alternatively, the fine polymer particles preferably form an emulsion in the clear ink composition and have an average particle diameter of 70 nm or less.

The fine polymer particles undergo colloidal dispersion and disperse into a transparent or semitransparent emulsion in the clear ink composition containing these fine polymer particles. It was learned that the glossiness in the non-print portions or low-duty portions of a recorded image can be markedly improved and an excellent record obtained by depositing the clear ink composition and a colorant-containing ink composition on a recording medium to perform recording.

The glass transition temperature (Tg; measured according to JIS K6900) of the fine polymer particles is preferably 70° C. or less. In this case, the fine polymer particles can form an emulsion in water with greater ease, and higher-quality recorded images can be obtained.

The fine polymer particles preferably comprise a copolymer (referred to hereinbelow as "an alkali-soluble resin") obtained by polymerizing an ethylenic unsaturated carboxylic acid monomer and another monomer copolymerizable therewith, in the presence of a copolymerizable surfactant or a water-soluble macromolecular compound containing alcoholic hydroxyl groups.

The pH of the copolymer is preferably adjusted with the aid of a base.

The base is preferably an inorganic base.

The inorganic base is particularly preferably an alkali metal hydroxide or alkaline-earth metal hydroxide.

The acid value of the copolymer is preferably 40 or less.

The water-soluble macromolecular compound containing alcoholic hydroxyl groups is preferably a vinyl alcohol polymer.

Specifically, the water-soluble macromolecular compound preferably comprises 5 to 25 alcoholic hydroxyl groups per 1000 of molecular weight. Examples include polyvinyl alcohol, modification products thereof, and other vinyl alcohol polymers; saponified copolymers of vinyl acetate with acrylic acid, methacrylic acid, or maleic anhydride; alkyl cellulose, hydroxyalkyl cellulose, alkyl hydroxyalkyl cellulose, and other cellulose derivatives; alkyl starch, carboxymethyl starch, and other starch derivatives; gum arabic and tragacanth gum; and polyalkylene glycol. The water-soluble macromolecular compounds containing alcoholic hydroxyl groups may be used singly or as combinations of two or more compounds.

Examples of suitable ethylenic unsaturated carboxylic acid monomers include acrylic acid, methacrylic acid, and other ethylenic unsaturated monocarboxylic acid monomers; itaconic acid, maleic acid, fumaric acid, butene tricarboxylic acid, and other ethylenic unsaturated polycarboxylic acid monomers; monobutyl fumarate, monobutyl maleate, mono-2-hydroxypropyl maleate, and other partial ester monomers of ethylenic unsaturated polycarboxylic acids; and maleic anhydride, citraconic anhydride, and other polycarboxylic anhydrides. These monomers may be used singly or as combinations of two or more compounds.

Among these, acrylic acid and methacrylic acid are particularly preferred.

The other monomer copolymerizable with the ethylenic unsaturated carboxylic acid monomer is not subject to any particular limitations and may, for example, be styrene, α-methyl styrene, vinyl toluene, chlorostyrene, or another aromatic vinyl monomer; methyl (met)acrylate, ethyl (meth)acrylate, propyl (meth)acrylate, n-amyl (meth)acrylate, isoamyl (meth)acrylate, hexyl (meth)acrylate, ethyl hexyl (meth)acrylate, octyl (meth)acrylate, hydroxyethyl (meth) acrylate, hydroxypropyl (meth)acrylate, glycidyl (meth) acrylate, or another (meth)acrylic acid ester monomer; (meth)acrylonitrile or another ethylenic unsaturated monomer that contains cyano groups; allyl glycidyl ether or another ethylenic unsaturated glycidyl ether monomer; (meth)acrylamide, N-methylol (meth)acrylamide, N-butoxymethyl (meth)acrylamide, or another ethylenic unsaturated amide monomer; 1,3-butadiene, isoprene, 2,3-dimethyl-1,3-butadiene, 1,3-pentadiene, or another conjugate diene monomer; or vinyl acetate or another carboxylic acid vinyl ester monomer. These monomers may be used singly or as combinations of two or more compounds.

Among these, ethylenic unsaturated carboxylic acid monomers are preferred, and methyl (meth)acrylate, ethyl (meth)acrylate, and other (meth)acrylic acid esters are particularly preferred from the standpoint of excellent image glossiness and light fastness.

The other monomer copolymerizable with the ethylenic unsaturated carboxylic acid monomer may, for example, be methyl (met)acrylate, ethyl (meth)acrylate, propyl (meth) acrylate, n-amyl (meth)acrylate, isoamyl (meth)acrylate, hexyl (meth)acrylate, ethyl hexyl (meth)acrylate, octyl (meth)acrylate, hydroxyethyl (meth)acrylate, hydroxypropyl (meth)acrylate, glycidyl (meth)acrylate, or another (meth)acrylic acid ester monomer; or vinyl acetate or another carboxylic acid vinyl ester monomer. These monomers may be used singly or as combinations of two or more compounds.

The copolymerizable surfactant is a surfactant having one or more polymerizable vinyl groups per molecule. Examples of such surfactants include sodium propenyl-2-ethyl hexyl sulfosuccinate, (meth)acrylic acid polyoxyethylene sulfate, ammonium salts of polyoxyethylene alkyl propenyl ether sulfuric acid esters, (meth)acrylic acid polyoxyethylene ester phosphate, and other anionic polymerizable surfactants; and polyoxyethylene alkyl benzene ether (meth)acrylates, polyoxyethylene alkyl ether (meth)acrylates, and other anionic polymerizable surfactants. Among these, ammonium salts of polyoxyethylene alkyl propenyl ether sulfuric acid esters are preferred because of the emulsion dispersion capabilities of the monomers and the excellent copolymeric balance with the monomers. These copolymerizable surfactants may be used singly or as combinations of two or more compounds.

When the weight-average molecular weight (Mw) of the fine polymer particles is no less than 1000 but no greater than 1,000,000 (and preferably no less than 8000 but no greater than 20,000), an even more remarkable effect is obtained in terms of improved glossiness in the non-print portions or low-duty portions of recorded images.

When the pH of the fine polymer particles is no less than 8 but no greater than 11 (and preferably no less than 9 but no greater than 10), an even more remarkable effect is obtained in terms of improved glossiness in the non-print portions or low-duty portions of recorded images.

When the turbidity of the fine polymer particles is 30 mg/L or less, an even more remarkable effect is obtained in terms of improved glossiness in the non-print portions or low-duty portions of recorded images.

When the minimum film formation temperature (MFT) of the fine polymer particles is 20° C. or less, an even more remarkable effect is obtained in terms of improved glossiness in the non-print portions or low-duty portions of recorded images.

The content (in terms of solids content) of the fine polymer particles in the clear ink composition is preferably no less than 0.1 wt % but no greater than 5.0 wt %, and more preferably no less than 0.1 wt % but no greater than 2.0 wt %, from the standpoint of improved stability of recorded images and improved glossiness.

A single type of fine polymer particles may be added, or two or more types thereof may be mixed together and added. When such particles are mixed together and added, their total content in the ink composition is preferably no less than 0.1 wt % but no greater than 5.0 wt % (and more preferably no less than 0.1 wt % but no greater than 2.0 wt %).

In particular, a remarkable effect is obtained in terms of improved glossiness in the non-print portions or low-duty portions of recorded images if the fine polymer particles form an emulsion in the clear ink composition and have an average particle diameter of 70 nm or less, a glass transition temperature (Tg; measured according to JIS K6900) of 70° C. or less, a weight-average molecular weight (Mw) of no less than 50,000 but no greater than 1,000,000, and a minimum film formation temperature (MFT) of 20° C. or less, and if the content of the cationic resin as polyethyleneimine in the ink composition is no less than 0.1 wt % but no greater than 30.0 wt %.

Alternatively, the fine polymer particles are preferably fine polymer particles comprising a polymer that contains sulfonic acid groups.

The fine polymer particles undergo colloidal dispersion and disperse into a transparent or semitransparent emulsion in the clear ink composition containing these fine polymer particles. It was learned that the glossiness in the non-print portions or low-duty portions of a recorded image can be markedly improved and an excellent record obtained by depositing the clear ink composition and a colorant-containing ink composition on a recording medium to perform recording.

The polymer that contains sulfonic acid groups is preferably a polymer that contains diene-based sulfonic acid groups and/or a polymer that contains non-diene sulfonic acid groups.

The polymer that contains sulfonic acid groups may a product obtained by sulfonating a polymer or copolymer produced by homopolymerizing or copolymerizing the monomers shown below (see Japanese Patent Application Laid-open No. H11-217525), or is a polymer obtained by homopolymerizing or copolymerizing the sulfonated monomers, such as a polymer that contains diene-based sulfonic acid groups in which a diene-based monomer is an essential component, or a polymer that contains non-diene sulfonic acid groups in which a diene monomer is not an essential component.

Examples of monomers that can be used to obtain a polymer that contains sulfonic acid groups include diene-based monomers and other monomers usable with diene-based monomers.

Examples of suitable diene-based monomers include diene-based compounds with a carbon number of 4 to 10, such as 1,3-butadiene, 1,2-butadiene, 1,3-pentadiene, 1,2-pentadiene, 2,3-pentadiene, isoprene, 1,2-hexadiene, 1,3-hexadiene, 1,4-hexadiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene, and cycloheptadiene. These diene-based monomers may be used singly or as combinations of two or more compounds.

Examples of other monomers that can be used together with diene-based monomers include styrene, α-methylstyrene, O-methylstyrene, p-methylstyrene, m-methylstyrene, vinyl naphthalene, and other aromatic monomers; methyl (meth)acrylate, ethyl (meth)acrylate, butyl (meth)acrylate, and other (meth)acrylic acid alkyl esters; (meth)acrylic acid, crotonic acid, maleic acid, itaconic acid, and other mono- or dicarboxylic acids or dicarboxylic anhydrides; (meth)acrylonitrile and other vinyl cyan compounds; and vinyl chloride, vinylidene chloride, vinyl methyl ethyl ketone, vinyl acetate, (meth)acrylamide, glycidyl (meth)acrylate, and other unsaturated compounds. These other monomers may be used singly or as combinations of two or more compounds.

When these other monomers are also used, the amount in which the diene-based monomer is used is preferably 0.5 wt % or greater, more preferably 1 wt % or greater, and even more preferably 5 wt %.

The diene-based copolymer obtained by copolymerizing a diene-based monomer and a monomer that can be used together with the diene-based monomer may be any copolymer, including a random copolymer and a block copolymer.

Examples of preferred polymers include isoprene homopolymers, butadiene homopolymers, isoprene-styrene random copolymers, isoprene-styrene block copolymers, styrene-isoprene-styrene ternary block copolymers, butadiene-styrene random copolymers, butadiene-styrene block copolymers, styrene-butadiene-styrene block copolymers, styrene-butadiene-styrene ternary block copolymers, and ethylene-propylene-diene ternary block copolymers. Examples of more preferred copolymers include isoprene-styrene block copolymers, styrene-isoprene-styrene ternary block copolymers, butadiene-styrene ternary block copolymers, styrene-butadiene-styrene ternary block copolymers, and styrene-butadiene-styrene ternary block copolymers.

The polymer that contains diene-based sulfonic acid groups and is used in the present invention may be obtained by a process in which the aforementioned diene-based polymer and/or a polymer obtained by the partial or complete hydrogenation of residual double bonds and based on a precursor monomer thereof is sulfonated by a publicly known sulfonation method, such as the method described in "A New Course in Experimental Chemistry [Shin Jikken Kagaku Koza] (Vol. 14, III, p. 1773) by the Chemical Society of Japan, in Japanese Patent Application Laid-open No. H2-227403, and elsewhere.

Examples of suitable sulfonating agents include sulfuric anhydride, sulfuric acid, chlorosulfonic acid, fuming sulfuric acid, and bisulfites (Li salts, Na salts, K salts, Rb salts, Cs salts, and the like). The amount of the sulfonating agent in terms of sulfuric anhydride is preferably 0.005 to 1.5 mol, and more preferably 0.01 to 1.0 mol, per mole of the aforementioned polymer.

The polymer that contains diene-based sulfonic acid groups is preferably used in a state obtained by reacting water and/or a basic compound with a product sulfonated in the above-described manner. Examples of such basic compounds include alkali metal hydroxides, alkali metal alkoxides, alkali metal carbonates, ammonia water, organometallic compounds, and amines. Such basic compounds may be used singly, or two or more of them may be used together. The amount in which these basic compounds are used is 2 mol or less, and preferably 1.3 mol or less, per mole of the sulfonating agent used.

Examples of monomers that can be used to obtain a polymer that contains non-diene sulfonic acid groups include monomers containing sulfonyl groups such as allylsulfonic acid, vinylsulfonic acid, methacrylsulfonic acid obtained by reacting isobutylene and sulfur trioxide, and other vinyl monomers; sodium p-styrenesulfonate and other styrene-based monomers (for example, SPINOMAR; Tosoh's trademark); and methacrylic acid ester monomers (for example, ELEMINOL RS-30 by Sanyo Chemical) expressed by the general formula $CH_2=C(CH_3)-COO(AO)_nSO_3Na$ (where A is a lower alkylene group); as well as sodium salts, potassium salts, and lithium salts of these monomers.

A polymer that contains non-diene sulfonic acid groups may be obtained by copolymerizing a monomer that does not contain any sulfonic acid groups with a monomer containing sulfonic acid groups.

Examples of the other copolymerizable monomers include styrene, ethyl vinyl benzene, α-methyl styrene, vinyl toluene, fluorostyrene, vinyl pyridine, and other aromatic monovinyl compounds; butyl acrylate, 2-ethyl hexyl acrylate, β-methacryloyl oxyethyl hydroiene phthalate, N,N'-dimethylaminoethyl acrylate, and other acrylic acid ester monomers; 2-ethylhexyl methacrylate, methoxydiethylene glycol methacrylate, methoxypolyethylene glycol methacrylate, methyl methacrylate, ethyl methacrylate, butyl methacrylate, N,N'-dimethylaminoethyl methacrylate, glycidyl methacrylate, and other methacrylic acid ester monomers;

and acrylonitrile, methacrylonitrile, and other vinyl cyanide compounds, as well as silicon-modified monomers and macromonomers. Additional examples include butadiene, isoprene, and other conjugated double-bond compounds; vinyl acetate and other vinyl ester compounds; and 4-methyl-1-pentene and other α-olefin compounds. Styrene, methyl methacrylate, and acrylonitrile are preferred among these copolymerizable monomers.

The amount in which such copolymerizable monomers are used is commonly 1 to 93 wt %, and preferably 5 to 80 wt %, of the polymerizable monomers.

The polymer that contains non-diene sulfonic acid groups is obtained by a process in which a monomer that contains sulfonic acid groups is subjected, either alone or together with other copolymerizable monomers, to radical polymerization in a polymerization solvent such as water or an organic solvent by using a radical polymerization initiator, a chain-transfer agent, or the like.

The polymer that contains non-diene sulfonic acid groups obtained by copolymerizing a non-diene monomer may be any copolymer, including a random copolymer and a block copolymer.

In particular, a polymer that contains acrylic sulfonic acid groups is preferred as the polymer that contains non-diene sulfonic acid groups.

The acid value of the fine polymer particles is preferably 100 or greater.

The weight-average molecular weight (Mw) of the fine polymer particles is preferably no less than 8,000 but no greater than 20,000, and the glass transition temperature (Tg; measured according to JIS K6900) is preferably no less than 5° C. but no greater than 50° C. In this case, the fine polymer particles can form an emulsion in water with greater ease, and the glossiness in the non-print portions or low-duty portions of recorded images can be further improved.

In addition, an even more remarkable effect is obtained in terms of improved glossiness in the non-print portions or low-duty portions of recorded images when the minimum film formation temperature (MFT) of the fine polymer particles is 20° C. or less.

The content (in terms of solids content) of the fine polymer particles in the clear ink composition is preferably no less than 0.1 wt % but no greater than 5.0 wt %, and more preferably no less than 0.1 wt % but no greater than 2.0 wt %, from the standpoint of improved stability of recorded images and improved glossiness.

A single type of fine polymer particles may be added, or two or more types thereof may be mixed together and added. When such particles are mixed together and added, their total content in the ink composition is preferably no less than 0.1 wt % but no greater than 5.0 wt % (and more preferably no less than 0.1 wt % but no greater than 2.0 wt %).

In particular, a remarkable effect is obtained in terms of improved glossiness in the non-print portions or low-duty portions of recorded images if the fine polymer particles form an emulsion in the clear ink composition and have an average particle diameter of 70 nm or less, a glass transition temperature (Tg; measured according to JIS K6900) of no less than 5° C. but no greater than 50° C., a weight-average molecular weight (Mw) of no less than 8,000 but no greater than 20,000, and a minimum film formation temperature (MFT) of 20° C. or less, and if the content of polyethyleneimine as the cationic resin in the ink composition is no less than 0.1 wt % but no greater than 30.0 wt %.

The cationic resin may be a resin that contains amino groups.

Alternatively, the cationic resin may be polyethyleneimine.

A macromolecule containing at least one type of repeating units expressed by General Formula (1) below is suitable as such polyethyleneimine.

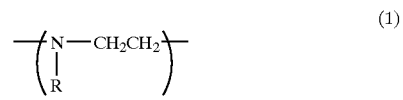

(In formula (1), R is hydrogen, an optionally substituted alkyl group, an optionally substituted aryl group, an optionally substituted pyridine group, an optionally substituted alkylamino group, or an optionally substituted hydrazino group.)

The glossiness and coloring properties of recorded images are further improved by adopting the above structure.

The weight-average molecular weight (Mw) of the polyethyleneimine is preferably no less than 100,000, more preferably 100 to 10,000, and even more preferably 100 to 5000, from the standpoint of coloring properties, glossiness, and improved clear ink storage properties.

The polyethyleneimine may be obtained by a process in which ethyleneimine is subjected to ring-opening polymerization in which carbon dioxide, hydrochloric acid, hydrobromic acid, p-toluenesulfonic acid, aluminum chloride, boron trifluoride, or the like is used as a catalyst; by a polycondensation reaction involving ethylene chloride and an ethylenediamine-based compound; or the like.

Following are specific examples of macromolecules containing at least one type of repeating units expressed by General Formula (1).

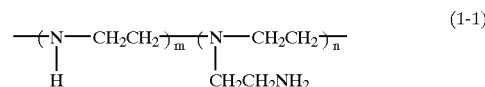

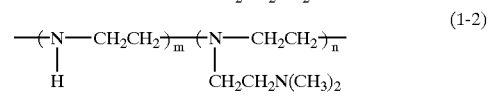

(In the formulas, m and n are numerical values selected such that the weight-average molecular weight (Mw) of polyethyleneimine is 100,000 or less.)

In the polyethyleneimine used, some of the side chains or terminals may be anionically or cationically modified.

The polyethyleneimine content is preferably no less than 0.1 wt % but no greater than 30.0 wt %, more preferably no less than 0.1 wt % but no greater than 5.0 wt %, and even more preferably no less than 0.1 wt % but no greater than 2.0 wt %, from the standpoint of improved coloring properties and improved glossiness.

A single type of polyethyleneimine may be added, or two or more types thereof may be mixed together and added. When such compounds are mixed together and added, their total content is preferably no less than 0.1 wt % but no greater than 5.0 wt % (and more preferably no less than 0.1 wt % but no greater than 2.0 wt %).

The cationic resin is preferably a polymer of a single monomer or a polymer of a plurality of monomers comprising at least one compound from among acrylic water-soluble monomers such as dimethylaminoethyl methacrylate (DM), methacryloyloxyethyl trimethylammonium chloride (DMC), methacryloyloxyethyl benzyl dimethylammonium chloride (DMBC), dimethylaminoethyl acrylate (DA), acryloyloxyethyl trimethylammonium chloride (DMQ), acryloyloxyethyl benzyl dimethylammonium chloride (DABC), dimethylaminopropyl acrylamide (DMAPAA), and acrylamidopropyl trimethylammonium chloride (DMAPAAQ). Thus, the glossiness and coloring properties of recorded images can be efficiently improved even when the cationic resin is a polymer containing an acrylic water-soluble monomer.

The cationic resin may also be a polyvinylamine, polyamide polyamine, polyamidine, polydimethylaminoethyl methacrylate, or polydimethylaminoethyl acrylate, as shown below.

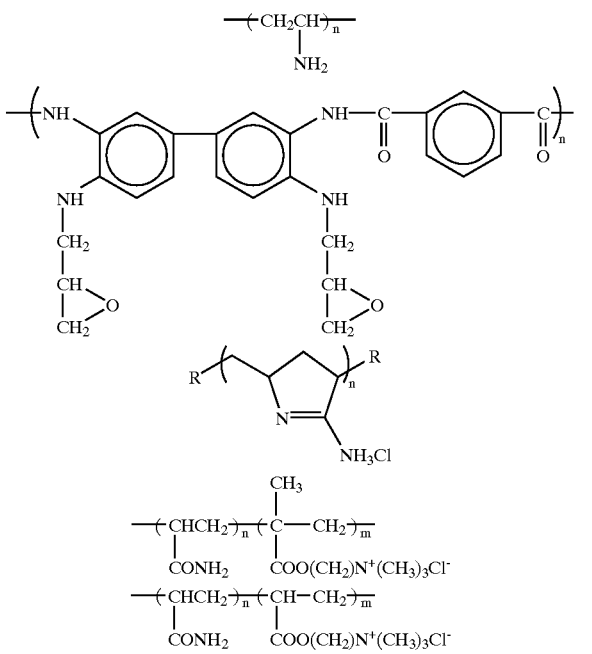

In the clear ink composition of the present invention, water is used as a solvent. Any type of water selected from deionized water, ultrafiltration water, reverse osmosis water, distilled water, and other types of purified water or ultrapure water can preferably be used as the water. Because the production of mold or bacteria is inhibited when these types of water are sterilized by irradiation with ultraviolet rays, by addition of hydrogen peroxide, or the like, such use is more preferred.

The clear ink composition may further comprise an acetylene glycol compound, acetylene alcohol compound, or polysiloxane compound as a surfactant.

The ejection stability of the clear ink composition can thereby be enhanced without degrading the coloring properties or glossiness. The improvement in ejection stability is attributed to a reduction in the surface tension of the clear ink composition or to the enhanced penetration of the clear ink composition into the recording medium.

The surfactant content of the clear ink composition is preferably no less than 0.1 wt % but no greater than 3.0 wt %, and more preferably no less than 0.1 wt % but no greater than 1.0 wt %.

The surface tension of the clear ink composition is preferably no less than 15 dyn/cm but no greater than 45 dyn/cm, and more preferably no less than 25 dyn/cm but no greater than 35 dyn/cm, from the standpoint of increased ejection stability.

OLFINE 1010, STG, and Y (all of which are registered trade names of products manufactured by Nissin Chemical); Surfynol 82, 104, 440, 465, or 485 (all of which are registered trade names of products manufactured by Air Products and Chemicals, Inc.); and other commercially available products may be used as such acetylene glycol compounds.

3,5-Dimethyl-1-hexyn-3-ol, 2,4-dimethyl-5-hexyn-3-ol, Surfynol 61 (registered trade name of a product manufactured by Air Products and Chemicals, Inc.), and the like may be used as such acetylene alcohol compounds.

Compounds expressed by General Formula (2) below may be

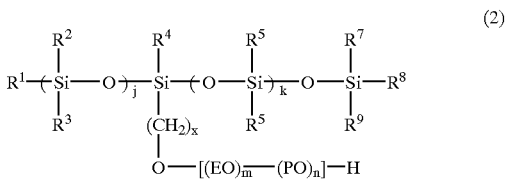

used as such polysiloxane compounds.

(In formula (2), $R^1$ to $R^9$ independently express $C_{1-6}$ alkyl groups; j, k, and x independently express integers of 1 or greater; EO expresses an ethylene oxy group; PO expresses a propylene oxy group; m and n express integers of 0 or greater; m+n expresses an integer of 1 or greater; and EO and PO may have random or block character irrespective of their sequence in the square brackets.)

The clear ink composition may further comprise a glycol ether compound or alkyl diol compound. Using these compounds as solvents allows the image quality of recorded images to be improved without lowering the coloring properties or glossiness. The content (the total amount when a plurality of types are mixed) of these compounds in the clear ink composition is preferably no less than 1.0 wt % but no greater than 30 wt %, and more preferably no less than 1.0 wt % but no greater than 10 wt %, from the standpoint of improved image quality.

Examples of suitable glycol ether compounds include triethylene glycol monobutyl ether, diethylene glycol monobutyl ether, propylene glycol monomethyl ether, diethylene glycol monoethyl ether, and diethylene glycol monomethyl ether. In particular, triethylene glycol monobutyl ether is suitable.

Examples of suitable alkyl diol compounds include 1,2-hexanediol and 1,2-pentanediol. In particular, 1,2-hexanediol is suitable.

The clear ink composition may further comprise a polyhydric alcohol compound. Examples of suitable polyhydric alcohol compounds include glycerol, ethylene glycol, triethylene glycol, propylene glycol, diethylene glycol, pentamethylene glycol, trimethylene glycol, 2-butene-1,4-diol, 2-ethyl-1,3-hexanediol, 2-methyl-2,4-pentanediol, dipropylene glycol, tetraethylene glycol, and other water-soluble organic solvents. In particular, glycerol is suitable.

The content (the total amount when a plurality of types are mixed) of these polyhydric alcohol compounds in the clear ink composition is preferably no less than 5.0 wt % but no greater than 40 wt %, and more preferably no less than 10 wt % but no greater than 30 wt %.

The clear ink composition of the present invention may further comprise a solvent commonly used in water-base ink compositions for-inkjet recording as needed. 2-Pyrrolidone, triethanolamine, and sugar may be cited as examples of such solvents. Specific examples of sugar include monosaccharides, disaccharides, oligosaccharides (including trisaccharides and tetrasaccharides), and polysaccharides, preferably glucose, mannose, fructose, ribose, xylose, arabinose, galactose, aldonic acid, glucitol, sorbitol, maltose, cellobiose, lactose, sucrose, trehalose, maltotriose, and the like. As used herein, "polysaccharide" means sugar in the broader sense of the word, and is used in a sense that includes the alginic acid, α-cyclodextrin, cellulose, and other substances widely occurring in the natural world. Examples of derivatives of such saccharides include reducing sugars of the aforementioned saccharides (for example, expressed by sugar alcohols (general formula: $HOCH_2(CHOH)_nCH_2OH$ (where n expresses an integer from 2 to 5), oxidizing sugars (for example, aldonic acid and uronic acid), amino acids, and thiosugar. In particular, sugar alcohols are preferred, specifically maltitol and sorbitol. HS-300, 500 (registered trade names of products manufactured by Hayashibara Group), and the like can be obtained as commercially available products.

The clear ink composition of the present invention may further comprise an aid. Examples of such aids include pH modifiers, chelating agents, preservatives, rust inhibitors, antioxidants, UV absorbers, oxygen absorbents, and abrasion resistance improvers.

(Ink Cartridge)

The ink cartridge of the present invention is designed to hold the above-described clear ink composition. The ink cartridge may be configured to hold the clear ink composition alone or to hold both the clear ink composition and a color ink composition (one that contains a colorant).

(Ink Set)

Preferred embodiments of the ink set of the present invention will now be described.

The ink set of the present invention comprises the above-described clear ink composition and at least a yellow ink composition, a magenta ink composition, and a cyan ink composition.

In the ink set of the present invention, the clear ink composition is provided separately from the color ink composition, making it possible to obtain recorded images that have excellent coloring properties and glossiness by performing recording with the aid of these compositions. In particular, the clear ink composition can be used for printing in non-print portion and low-duty portions based on a color ink composition, and the glossiness of the non-print portions and low-duty portions can be enhanced when specialty paper is used. The color ink composition can be uniformly deposited and glossiness enhanced by using the clear ink composition for printing. In particular, reproducibility can be markedly improved because white spots can be prevented and low lightness/high color saturation can be ensured on plain paper. The pigment content of the color ink or the weight of the color ink deposited on plain paper can be reduced because of improved color reproducibility. Consequently, glossiness on specialty paper and coloring on plain paper can be concurrently improved by the use of the ink set of the present invention.

The above-described set preferably further comprises a red ink composition whose hue angle is the hue angle of a mixed color of the aforementioned yellow ink composition and magenta ink composition.

The above-described set preferably further comprises a violet ink composition whose hue angle is the hue angle of a mixed color of the aforementioned magenta ink composition and cyan ink composition.

An ink set having excellent graininess can be obtained by providing a red ink composition or a violet ink composition. This is attributed to the fact that magenta or cyan have a low pigment solids content.

The above-described set may also comprise a black ink composition.

The ink set of the present invention comprises a yellow ink composition (Y), a magenta ink composition (M), a cyan ink composition (C), and other color ink compositions. Colorants, dispersants, and other components contained in the clear ink compositions used for common inkjet recording may be used for these without any particular limitations.

A yellow pigment may be appropriately used as a colorant for the yellow ink composition (Y). Examples of such yellow pigments include C.I. Pigment Yellow 74, 81, 83, 93, 109, 110, 120, 128, 138, 139, 150, 151, 154, 155, 173, 180, 185, and 195.

The yellow ink composition is preferably a composition whose hue angle is within a range of 80° to 110°, as defined in the CIELAB color space (CIE 1976 ($L^*a^*b^*$) calorimetric system, JIS Z 8729) on a recording medium.

A magenta pigment may be appropriately used as a colorant for the magenta ink composition (M). Examples of pigments preferred for use as such magenta pigments include C.I. Pigment Red 122, 202, 209, 112, 123, 168, 184, 5, 7, 12, 48 (Ca), 48 (Mn), 57 (Ca), and 57:1; C.I. Pigment Violet 19; and the like. In particular, C.I. Pigment Red 122 and 202 are preferred.

The magenta ink composition is preferably a composition whose hue angle is within a range of 330° to 360°, as defined in the CIELAB color space on a recording medium.

A cyan pigment may be appropriately used as a colorant for the cyan ink composition (C). C.I. Pigment Blue 15:3, 15:4, 60, 1, 2, 3, 16, 22, 15:34, and the like are preferred for use as such cyan pigments. In particular, C.I. Pigment Blue 15:3 is preferred.

The cyan ink composition is preferably a composition whose hue angle is within a range of 230° to 260°, as defined in the CIELAB color space.

A red pigment whose hue angle is the hue angle of a mixed color of a yellow ink composition and a magenta ink composition may be appropriately used as the colorant of the red ink composition (R). Examples of such red pigments include Pigment Red 17, 49:2, 112, 177, 178, 188, 255, 264, and 149.

A violet pigment whose hue angle is the hue angle of a mixed color of a magenta ink composition and a cyan ink composition may be appropriately used as the colorant of the violet ink composition (V). Examples of such violet pigments include Pigment Violet 3, 19, 23, 32, 36, and 38.

A black pigment may be appropriately used as the colorant of the black ink composition (K). Carbon black may be cited as an example of such a black ink composition.

The ink set of the present invention may comprise a light-yellow ink composition, a light-magenta ink composition, a light-cyan ink composition, a blue ink composition, a light-black ink composition, a green ink composition, a dark-yellow ink composition, an orange ink composition, and the like in addition to the above.

The orange ink composition is preferably a composition whose hue angle is within a range of 30° to 80°, as defined in the CIELAB color space.

The blue ink composition is preferably a composition whose hue angle is within a range of 160° to 230°, as defined in the CIELAB color space.

The lightness of the orange ink composition and the lightness of the blue ink composition are preferably less than the lightness of the magenta ink composition and the lightness of the cyan ink composition.

The chroma of the orange ink composition and the chroma of the blue ink composition are preferably higher than the chroma of the magenta ink composition and the chroma of the cyan ink composition.

The colorant content of the ink composition is preferably 0.1 to 20 wt %, and more preferably 0.5 to 10 wt %. The colorant content is appropriately adjusted in accordance with the type of variable-concentration clear ink composition or other ink composition.

The clear ink composition and/or color ink composition may further comprise a solvent commonly used in the water-base ink compositions for inkjet recording as needed. 2-Pyrrolidone, triethanolamine, and sugar may be cited as examples of such solvents. Specific examples of sugar include monosaccharides, disaccharides, oligosaccharides (including trisaccharides and tetrasaccharides), and polysaccharides, preferably glucose, mannose, fructose, ribose, xylose, arabinose, galactose, aldonic acid, glucitol, sorbitol, maltose, cellobiose, lactose, sucrose, trehalose, maltotriose, and the like. As used herein, "polysaccharide" means sugar in the broader sense of the word, and is used in a sense that includes the alginic acid, α-cyclodextrin, cellulose, and other substances widely occurring in the natural world. Examples of derivatives of such saccharides include reducing sugars of the aforementioned saccharides (for example, expressed by sugar alcohols (general formula: $HOCH_2(CHOH)_nCH_2OH$ (where n expresses an integer from 2 to 5), oxidizing sugars (for example, aldonic acid and uronic acid), amino acids, and thiosugar. In particular, sugar alcohols are preferred, specifically maltitol and sorbitol. HS-300, 500 (registered trade names of products manufactured by Hayashibara Group), and the like can be obtained as commercially available products.

The clear ink composition and/or color ink composition may further comprise an aid. Examples of such aids include pH modifiers, chelating agents, preservatives, rust inhibitors, antioxidants, UV absorbers, oxygen absorbents, and abrasion resistance improvers.

(Method for Producing an Inkjet Record)

The method for producing an inkjet record in accordance with the present invention will now be described.

The method for producing an inkjet record in accordance with the present invention comprises depositing the aforementioned clear ink composition and color ink composition on a recording medium to form a record. Alternatively, the method for producing an inkjet record in accordance with the present invention comprises performing such recording through the use of the aforementioned ink set.

In particular, the glossiness of color ink on specialty paper can be markedly improved by performing recording in accordance with the present invention. The glossiness of non-print portions and low-duty portions based on a color ink composition can be improved using a clear ink composition for printing on these non-print portions and low-duty portions. In addition, the color ink composition can be uniformly deposited on plain paper to improve the coloring properties. The pigment content of the color ink or the weight of the color ink deposited on plain paper can be reduced because of the improved coloring properties. Consequently, improved glossiness on specialty paper and enhanced coloring on plain paper can be concurrently ensured in accordance with the present method.

In the above-described method, the duties of the clear ink composition on the recording medium are preferably less than the duties of the color ink composition. The coloring properties can be further enhanced by using a small amount of the clear ink composition for printing.

In the above-described method, the clear ink composition and the ink composition may be ejected during the same process. As used herein, the term "during the same process" refers to a process in which a specific image is formed both by the clear ink composition and by the ink composition within a single recording cycle (pass). Consequently, the term "during the same process" includes, in addition to cases in which the two are ejected completely simultaneously, cases in which the ink composition is first ejected, and the clear ink composition is then ejected within the same pass; and cases in which the clear ink composition is first ejected, and the ink composition is then ejected within the same pass.

In the above-described method, the clear ink composition is preferably deposited such that, in portions in which the duty of the color ink composition on the recording medium is equal to or less than the target duty value, the sum of the duty value of the color ink composition and the duty value of the clear ink composition is equal to or greater than the target duty value. By performing recording in this manner, it is possible to obtain records whose recorded images have particularly good coloring properties and glossiness when special glossy paper (PM photographic paper or the like) with a resin coat is used as the recording medium. The target duty value is preferably 40%. Ink overflow under low temperature and humidity can be prevented by performing recording in this manner.

Alternatively, the clear ink composition is preferably deposited in the regions of a recording medium surface at a constant duty value irrespective of the duties of the color ink composition on the recording medium in accordance with the above-described method. A record whose recorded images have particularly good coloring properties can by obtained by performing recording in this manner when plain paper without a resin coat is used as the recording medium. In particular, the clear ink composition is preferably deposited at a constant duty of 20% or less (for example, at a duty of 10%) in the regions of a recording medium surface on which a record is formed by a color ink composition. Warping or crinkling of the recording medium can be prevented by keeping the duty at 20% or less.

The method for producing an inkjet record in accordance with the present invention may also comprise depositing the aforementioned clear ink composition and color ink composition on a recording medium to form a recording, and subsequently heating the recording surface to a temperature equal to or greater than the glass transition temperature of the fine polymer particles. The glossiness of non-print portions or low-duty portions can be further improved by such heating.

A record whose recorded images combine good coloring properties and glossiness can be obtained using these record producing methods.

Embodiments

The present invention will now be described in further detail through embodiments, but the present invention is not limited in any way by these examples.

[Embodiment I]

Clear inks (1) to (3) and color inks (4) to (6) having the following compositions were prepared.

(Clear Ink (1))

| | |
|---|---|
| Polyethyleneimine | 2.0 wt % |
| OLFINE E1010 | 0.5 wt % |
| Glycerol | 20 wt % |
| Ethylene glycol | 10 wt % |
| 1,2-Hexanediol | 5.0 wt % |
| Water | Balance |
| Total | 100 wt % |

(Clear Ink (2))

| | |
|---|---|
| Polyethyleneimine | 5.0 wt % |
| OLFINE E1010 | 0.5 wt % |
| Glycerol | 20 wt % |
| Ethylene glycol | 10 wt % |
| 1,2-Hexanediol | 5.0 wt % |
| Water | Balance |
| Total | 100 wt % |

(Clear Ink (3))

| | |
|---|---|
| Polyethyleneimine | 15.0 wt % |
| OLFINE E1010 | 0.5 wt % |
| Glycerol | 20 wt % |
| Ethylene glycol | 10 wt % |
| 1,2-Hexanediol | 5.0 wt % |
| Water | Balance |
| Total | 100 wt % |

The polyethyleneimine used in the clear inks (1) to (3) described above is shown by Chemical Formula (1-1) below and has a weight-average molecular weight (Mw) of 2000.

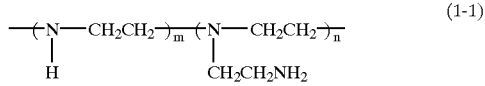
(1-1)

The surface tension of the above-described clear ink compositions was measured by CBVP-Z, which is manufactured by Kyowa Interface Science, and was found to be 25 to 35 dyn/cm in (1) to (3).

(Magenta Ink (4))

| | |
|---|---|
| Pigment (PR202) | 1.5 wt % |
| Styrene-acrylic copolymer resin (in terms of solids) | 0.5 wt % |
| OLFINE E1010 | 0.5 wt % |
| Glycerol | 20 wt % |
| 1,2-Hexanediol | 5.0 wt % |
| 2-Pyrrolidone | 2 wt % |
| TEA (triethanolamine) | 1 wt % |
| Water | Balance |
| Total | 100 wt % |

(Yellow Ink (5))

| | |
|---|---|
| Pigment (PY74) | 3.0 wt % |
| Styrene-acrylic copolymer resin (in terms of solids) | 1.0 wt % |
| OLFINE E1010 | 0.5 wt % |
| Glycerol | 20 wt % |
| 1,2-Hexanediol | 5.0 wt % |
| 2-Pyrrolidone | 2 wt % |
| TEA (triethanolamine) | 1 wt % |
| Water | Balance |
| Total | 100 wt % |

(Cyan Ink (6))

| | |
|---|---|
| Pigment (PB 15:3) | 1.5 wt % |
| Styrene-acrylic copolymer resin (in terms of solids) | 0.5 wt % |
| OLFINE E1010 | 0.5 wt % |
| Glycerol | 20 wt % |
| 1,2-Hexanediol | 5.0 wt % |
| 2-Pyrrolidone | 2 wt % |
| TEA (triethanolamine) | 1 wt % |
| Water | Balance |
| Total | 100 wt % |

[Gloss Test using Specialty Paper]

An inkjet printer (MC-2000, manufactured by Seiko Epson) was used for printing with the clear inks (1) to (3) described above to obtain records at 720×720 dpi and 100% duty on inkjet specialty paper (PM photographic paper manufactured by Seiko Epson).

As used in the present specification, "duty" is a value calculated using the following formula.

Duty (%)=Actual number of print dots/(Vertical resolution×Horizontal resolution)×100

(In the formula, "actual number of print dots" is the actual number of print dots per unit surface area; "vertical resolution" and "horizontal resolution" are the corresponding resolutions per unit surface area; and "100% duty" is the maximum weight of monochromatic ink in a pixel.)

Printing was performed and records obtained at 40% duty under the same conditions. The ejection stability of clear ink was satisfactory.

The gloss of the resulting records was tested in the following manner. GP-200, manufactured by Murakami Color Research Laboratory, was used to measure the maximum value of gloss with an ND10 filter at 12 V and 50 W by setting the standard mirror plate to 42.5 and keeping the incident light aperture at 1 mm, the reflected light aperture at 1.5 mm, the incident angle at 45 degrees, and the fan angle at 0 degrees. It was found that gloss-imparting properties became more pronounced with an increase in the maximum value of gloss.

(Evaluation Criteria)

A: Maximum gloss is 40 or greater
B: Maximum gloss is no less than 30 but less than 40
C: Maximum gloss is no less than 20 but less than 30
D: Maximum gloss is no less than 10 but less than 20
E: Maximum gloss is less than 10

Table 1 shows evaluation results based on these evaluation criteria.

TABLE 1

| | 45-Degree gloss | |
|---|---|---|
| | Print duty (%) | |
| Clear ink | 40 | 100 |
| 1 | D | C |
| 2 | D | C |
| 3 | D | C |
| None (comparative example) | E | E |

Adequate glossiness was obtained with clear inks (1) to (3), as shown in Table 1.

In addition, clear inks (1) to (3) were used for printing at 20% duty in low-duty color ink portions (20% duty and 30% duty), and the coloring properties were improved, as shown in Table 2.

TABLE 2

| | 45-Degree gloss | | | | | |
|---|---|---|---|---|---|---|
| | Color ink, duty 20% | | | Color ink, duty 30% | | |
| Clear ink | Y | M | C | Y | M | C |
| 1 | A | A | A | A | A | A |
| 2 | A | A | A | A | A | A |
| 3 | A | A | A | A | A | A |
| None (comparative example) | B | B | B | B | B | B |

[Coloration Test using Plain Paper]

The clear inks (1) and (3) and color inks (4) to (6) described above were combined together, an inkjet printer (MC-2000, manufactured by Seiko Epson) was used, color inks (4) to (6) were used for printing on plain paper (Xerox 4024) at 720×720 dpi and 70% duty, clear inks (1) to (3) were used for printing at 10% duty at substantially the same time, and records were obtained. Adequate recorded images were obtained in all cases. All the color inks and clear inks had adequate ejection stability.

Optical densities of the resulting records were measured. The densities were measured using GretagMacBeth SPM 50, manufactured by GretagMacBeth, with the aid of a D50 light source at an angle of view of 2° without any filter.

(Evaluation Criteria)

A: Uncolored portions are difficult to identify visually

B: Uncolored portions can be easily identified visually

Table 3 shows evaluation results based on these evaluation criteria.

TABLE 3

| | Color inks | | |
|---|---|---|---|
| Clear inks | Y | M | C |
| 1 | A(1.02) | A(0.71) | A(0.93) |
| 3 | A(1.02) | A(0.71) | A(0.93) |
| 3 | A(1.02) | A(0.71) | A(0.93) |
| None (comparative example) | B(0.97) | B(0.64) | B(0.87) |

In comparison with cases in which no clear inks were used, using clear inks (1) to (3) made it possible to prevent decolorization on plain paper and endowed recorded images with good coloring properties, as shown in Table 3.

[Embodiment II]

(Preparation of Emulsion D)

55 parts of ethyl acrylate, 37 parts of methyl acrylate, 6 parts of methacrylic acid, 3 parts of octyl thioglycolate as a pH modifier, 2.5 parts of polyvinyl alcohol, and 280 parts of deionized water were stirred and mixed to prepare a monomer mixture dispersion.

130 parts of deionized water and 2 parts of potassium persulfate were subsequently introduced into a stirred reactor, the temperature was raised to 80° C., and the aforementioned monomer mixture dispersion was continuously added over a period of 4 hours and polymerized. A reaction was conducted for 30 minutes at 80° C. after the continuous addition had been completed.

A 10% aqueous solution of sodium hydroxide was subsequently added to the reactor in an amount that was commensurate with the amount of sodium hydroxide and was equimolar in relation to the methacrylic acid introduced, the system was heated for another hour at 80° C., and an appropriate amount of deionized water was added, yielding a resin with a solids concentration of 15%. The acid value of the resin was 40; the pH, 9.2.

(Preparation of Emulsion C)

(1) 100 g of dioxane was introduced into a reaction container made of glass, 11.8 g of sulfuric hydroxide was added thereto while the internal temperature was kept at 25° C., and the system was stirred for 2 hours, yielding a sulfuric hydroxide/dioxane complex.

(2) The entire amount of the complex obtained in (1) above was subsequently added to 100 g of a THF solution (concentration: 15%) of a styrene/isoprene/styrene ternary block copolymer (weight ratio: 10/80/10; Mw=100,000) while the internal temperature was kept at 25° C., and stirring was continued for another 2 hours.

(3) 1200 g of water, 7.1 g of sodium hydroxide, and 1 g of sodium dodecylbenzenesulfonate were introduced into a flask, and the internal temperature was kept at 40° C. The entire amount of the solution in (2) was added in drops thereto over a period of 1 hour while the internal temperature was kept at 40° C. Following the dropwise addition, the system was stirred for 2 hours at 40° C., and the solvent was removed by vacuum distillation while water was allowed to remain, yielding sulfonated polymer emulsion C with a concentration of 15%. The content of sulfonic acid in the solids was 1.2 mmol/g.

(Preparation of Emulsion A)

100 mL of deionized water and 0.1 g of potassium persulfate were introduced into a flask equipped with a stirrer, temperature gage, reflux condenser, and dropping funnel; and the system was stirred under a nitrogen atmosphere and heated until the temperature inside the flask reached 70° C. Separately, 100 mL of deionized water, 1.0 g of sodium dodecylbenzenesulfonate, 30 g of styrene, 55 g of 2-ethylhexyl acrylate, and 5 g of methacrylic acid were introduced into the reaction container and stirred to prepare an emulsion. The emulsion was then gradually added in drops to the flask through the dropping funnel to prepare an emulsion that contained fine polymer particles as the dispersoid. The emulsion was cooled to room temperature, the cooled emulsion was filtered with a 0.4-$\mu$m filter, and distilled water was further added to bring the concentration of the fine polymer particles to 30%, yielding emulsion A.

The fine polymer particles in the resulting emulsion D were measured for their glass transition temperature (Tg; measured according to JIS K6900), weight-average molecular weight (Mw), minimum film formation temperature (MFT), and turbidity, and it was found that Tg was 25° C., the average particle diameter was 50 nm or less, Mw was 11,000, MFT was 15° C., and the turbidity was 30 mg/L or less.

The fine polymer particles in the resulting emulsion C were also measured in the same manner, and it was found that Tg was 25° C., the average particle diameter was 50 nm or less, Mw was 10,000, MFT was 15° C., and the turbidity was 30 mg/L or less.

The fine polymer particles in the resulting emulsions A were measured for their glass transition temperature (Tg; measured according to JIS K6900), weight-average molecular weight (MW), minimum film formation temperature (MFT), and turbidity, and it was found that Tg was −15° C., the average particle diameter was 130 nm, Mw was 500,000, MFT was 0° C., and the turbidity was 30 mg/L.

The turbidity was measured using a turbidity meter (WATER ANALYZER 2000, manufactured by Nippon Denshoku Industries) at a cell width of 10 mm.

Clear inks and color inks having the following compositions were prepared.

| (Clear Ink (1)) | |
| --- | --- |
| Polyethyleneimine | 2.5 wt % |
| Emulsion D (in terms of solids) | 2.0 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Clear Ink (2)) | |
| Polyethyleneimine | 2.5 wt % |
| Emulsion C (in terms of solids) | 2.0 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Clear Ink (3)) | |
| Polyethyleneimine | 2.5 wt % |
| Emulsion A (in terms of solids) | 1.0 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Clear Ink (4)) | |
| Polyethyleneimine | 2.5 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

The polyethyleneimine used as described above is shown by Chemical Formula (1-1) below and has a weight-average molecular weight (Mw) of 800.

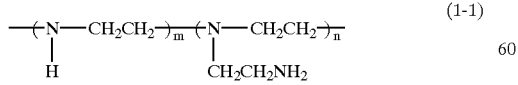
(1-1)

The surface tension of the above-described clear ink compositions was measured by CBVP-Z, which is manufactured by Kyowa Interface Science, and was found to be 25 to 35 dyn/cm in inks (1) to (4).

| (Magenta Ink (5)) | |
| --- | --- |
| Pigment (PR202) | 1.5 wt % |
| Styrene-acrylic copolymer resin (in terms of solids) | 0.5 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Yellow Ink (6)) | |
| Pigment (PY74) | 3.0 wt % |
| Styrene-acrylic copolymer resin (in terms of solids) | 1.0 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Cyan Ink (7)) | |
| Pigment (PB 15:3) | 1.5 wt % |
| Styrene-acrylic copolymer resin (in terms of solids) | 0.5 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Red Ink (8)) | |
| Pigment (PR178) | 2.0 wt % |
| Styrene-acrylic copolymer resin (in terms of solids) | 0.7 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Violet Ink (9)) | |
| Pigment (PV23) | 2.0 wt % |
| Styrene-acrylic copolymer resin (in terms of solids) | 0.7 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Magenta Ink (10)) | |
| Pigment (PR202) | 6.0 wt % |
| Styrene-acrylic copolymer resin (in terms of solids) | 2.0 wt % |
| OLFINE E1010 | 0.5 wt % |
| Glycerol | 20.0 wt % |
| Ethylene glycol | 10.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

-continued

| (Yellow Ink (11)) | |
| --- | --- |
| Pigment (PY74) | 6.0 wt % |
| Styrene-acrylic copolymer resin (in terms of solids) | 2.0 wt % |
| OLFINE E1010 | 0.5 wt % |
| Glycerol | 20.0 wt % |
| Ethylene glycol | 10.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Cyan Ink (12)) | |
| Pigment (PB 15:3) | 4.0 wt % |
| Styrene-acrylic copolymer resin (in terms of solids) | 1.3 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Black Ink (13)) | |
| Pigment (carbon black) | 2.0 wt % |
| Styrene-acrylic copolymer resin (in terms of solids) | 2.0 wt % |
| OLFINE E1010 | 0.5 wt % |
| Glycerol | 20.0 wt % |
| Ethylene glycol | 20.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Black Ink (14)) | |
| Pigment (carbon black) | 6.0 wt % |
| Styrene-acrylic copolymer resin (in terms of solids) | 2.0 wt % |
| OLFINE E1010 | 0.5 wt % |
| Glycerol | 20.0 wt % |
| Ethylene glycol | 10.0 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

Clear inks (1) to (4) were combined with the color and black inks (5) to (13) described above to create the ink sets shown in Table 4.

TABLE 4

| | Magenta | Yellow | Cyan | Red | Violet | Black | Clear |
| --- | --- | --- | --- | --- | --- | --- | --- |
| Ink set A | (10) | (11) | (12) | — | — | — | (1) |
| Ink set B | (5) | (6) | (7) | — | — | (13) | (2) |
| Ink set C | (5) | (6) | (7) | (8) | (9) | (13) | (1) |
| Ink set D | (5) | (6) | (7) | (8) | (9) | (13) | (2) |
| Ink set E | (5) | (6) | (7) | (8) | (9) | (13) | (3) |
| Ink set F | (5) | (6) | (7) | (8) | (9) | (13) | (4) |
| Ink set G (comparative example) | (10) | (11) | (12) | — | — | — | — |
| Ink set H (comparative example) | (5) | (6) | (7) | — | — | (13) | — |
| Ink set I (comparative example) | (5) | (6) | (7) | (8) | (9) | (13) | — |

[Gloss Test using PM Photographic Paper]

An inkjet printer (MC-2000, manufactured by Seiko Epson) was used with the ink sets of Table 4 for printing on inkjet specialty paper (PM photographic paper manufactured by Seiko Epson) at 720×720 dpi. The inks had adequate ejection stability.

Print patterns were created such that the single color of each of the color and black inks and the mixed colors of two or more types of ink had a total duty of 0% (non-print portions), 10%, 20%, 40%, or 100%. The following two types of printing were performed using clear inks.

1. Clear print duty of 20%: clear ink was deposited at uniform 20% duty in areas that had a print duty of 20% or less, and 2. Clear print duty of 40%: clear ink was deposited at uniform 40% duty in areas that had a print duty of 40% or less.

The gloss of the resulting records was tested in the following manner. GP-200, manufactured by Murakami Color Research Laboratory, was used to measure the maximum value of gloss with an ND10 filter at 12 V and 50 W by setting the standard mirror plate to 42.5 and keeping the incident light aperture at 1 mm, the reflected light aperture at 1.5 mm, the incident angle at 45 degrees, and the fan angle at 0 degrees. It was found that gloss-imparting properties became more pronounced with an increase in the maximum value of gloss.

(Evaluation Criteria)
A: Maximum gloss is 40 or greater
B: Maximum gloss is no less than 30 but less than 40
C: Maximum gloss is no less than 20 but less than 30
D: Maximum gloss is no less than 10 but less than 20
E: Maximum gloss is less than 10

Human images that conformed to ISO 400 were printed by the same printing method as above, and the gloss state was visually evaluated in the manner described below.

(Evaluation Criteria)

Excellent: Uniformly high shine is obtained.

Good: Substantially uniform shine is obtained, but some areas have low gloss, conveying a subtle perception of low quality Poor: The gloss is nonuniform, a perception of low quality is conveyed Table 5 shows evaluation results based on these evaluation criteria.

TABLE 5

| | Clear print duty | 0%, non-print portions | 10% | 20% | 40% | 100% | Gloss state |
| --- | --- | --- | --- | --- | --- | --- | --- |
| Ink set A | 20% | A | A | A | D | D | Good |
| | 40% | A | A | A | D | D | Good |
| Ink set B | 20% | A | A | A | A | A | Good* |
| | 40% | A | A | A | A | A | Good* |
| Ink set C | 20% | A | A | A | A | A | Excellent |
| | 40% | A | A | A | A | A | Excellent |
| Ink set D | 20% | A | A | A | A | A | Excellent |
| | 40% | A | A | A | A | A | Excellent |
| Ink set E | 20% | A | A | A | A | A | Excellent |
| | 40% | A | A | A | A | A | Excellent |
| Ink set F | 20% | C | A | A | A | A | Good |
| | 40% | C | A | A | A | A | Good |
| Ink set G (comparative example) | — | E | C | C | D | D | Poor |
| Ink set H (comparative example) | — | E | B | B | A | A | Poor |

TABLE 5-continued

| | Clear print duty | 0%, non-print portions | 10% | 20% | 40% | 100% | Gloss state |
|---|---|---|---|---|---|---|---|
| Ink set I (comparative example) | | E | B | B | A | A | Por |

The glossiness of non-print portions (0% duty portions) was improved by using clear ink for printing, as shown in Table 5.

In addition, the glossiness of low-duty portions was improved and the differences in glossiness from high-duty portions were reduced by the deposition of clear ink.

The effect by which glossiness is adjusted with the aid of such clear inks becomes pronounced when an ink set with a relatively low pigment concentration is used. In addition, cases in which images are printed using ink sets obtained by adding special colors such as red and violet to the four basic colors are more effective than cases in which images are printed using the four basic colors yellow, magenta, cyan, and black. Although the reason for this is not clear, it is believed that the overall print duty decreases when special colors are added to print images. (The asterisks in Table 2 designate cases in which a perception of low quality is believed to be conveyed because of the high overall print duty.)

[Coloration Test using Plain Paper]

The ink sets A2 to I2 shown in Table 6 were used by an inkjet printer (MC-2000, manufactured by Seiko Epson) on plain paper (Xerox 4024) at 720×720 dpi, color ink compositions were used for printing at 70% duty, clear inks were used for printing at 10% duty at substantially the same time, and records were obtained. Adequate recorded images were obtained in all cases. All the color inks and clear inks had adequate ejection stability.

TABLE 6

| | Magenta | Yellow | Cyan | Red | Violet | Black | Clear |
|---|---|---|---|---|---|---|---|
| Ink set A2 | (10) | (11) | (12) | — | — | — | (1) |
| Ink set B2 | (5) | (6) | (7) | | | (14) | (2) |
| Ink set C2 | (5) | (6) | (7) | (8) | (9) | (14) | (1) |
| Ink set D2 | (5) | (6) | (7) | (8) | (9) | (14) | (2) |
| Ink set E2 | (5) | (6) | (7) | (8) | (9) | (14) | (3) |
| Ink set F2 | (5) | (6) | (7) | (8) | (9) | (14) | (4) |
| Ink set G2 (comparative example) | (10) | (11) | (12) | — | — | — | — |
| Ink set H2 (comparative example) | (5) | (6) | (7) | — | — | (13) | — |
| Ink set I2 (comparative example) | (5) | (6) | (7) | (8) | (9) | (13) | — |

Optical densities of the resulting records were measured. The densities were measured using GretagMacBeth SPM 50, manufactured by GretagMacBeth, with the aid of a D50 light source at an angle of view of 2° without any filter.

(Evaluation Criteria)

A: Uncolored portions are difficult to identify visually

B: Uncolored portions can be easily identified visually

[Measurement of Chroma Area using Plain Paper]

Optical densities of the resulting records were measured. The densities were measured using GretagMacBeth SPM 50, manufactured by GretagMacBeth, with the aid of a D50 light source at an angle of view of 2° without any filter; and the chroma area was measured in a case in which a surface area of 1 was assigned to a region comprising a=1 and b=1 in the L*a*b* colorimetric system defined by CIE.

Table 7 shows evaluation results based on these evaluation criteria.

TABLE 7

| | Chroma area | Y(11) Dy | M(10) Dm | C(12) Dc | Y(6) Dy | M(5) Dm | C(7) Dc | K(14) Dk | R(8) Dy | R(8) Dm | V(9) Dm | V(9) Dc |
|---|---|---|---|---|---|---|---|---|---|---|---|---|
| Ink set A2 | 7490 | A(1.16) | A(1.23) | A(1.17) | | | | A(1.51) | | | | |
| Ink set B2 | 5010 | | | | A(1.02) | A(0.71) | A(0.93) | A(1.51) | | | | |
| Ink set C2 | 7650 | | | | A(1.02) | A(0.71) | A(0.93) | A(1.51) | A(0.94) | A(0.79) | A(0.99) | A(1.10) |
| Ink set D2 | 7650 | | | | A(1.02) | A(0.71) | A(0.93) | A(1.51) | A(0.94) | A(0.79) | A(0.99) | A(1.10) |
| Ink set E2 | 7650 | | | | A(1.02) | A(0.71) | A(0.93) | A(1.51) | A(0.94) | A(0.79) | A(0.99) | A(1.10) |
| Ink set F2 | 7650 | | | | A(1.02) | A(0.71) | A(0.93) | A(1.51) | A(0.94) | A(0.79) | A(0.99) | A(1.10) |
| Ink set G2 (comparative example) | 6660 | B(1.11) | B(1.13) | B(1.13) | | | | B(1.45) | | | | |
| Ink set H2 (comparative example) | 4470 | | | | B(0.97) | B(0.64) | B(0.87) | B(1.45) | | | | |

TABLE 7-continued

| | Chroma area | Y(11) Dy | M(10) Dm | C(12) Dc | Y(6) Dy | M(5) Dm | C(7) Dc | K(14) Dk | R(8) Dy | R(8) Dm | V(9) Dm | V(9) Dc |
|---|---|---|---|---|---|---|---|---|---|---|---|---|
| Ink set I2 (comparative example) | 6820 | | | | B(0.97) | B(0.64) | B(0.87) | B(1.45) | B(0.89) | B(0.74) | B(0.94) | B(1.06) |

Ink sets A2 to F2, which comprise a clear ink composition, prevent decolorization on plain paper and endow recorded images with good coloring properties, as shown in Table 7.

In comparison with ink sets G2 to I2 (comparative examples), which are free of a clear ink composition, ink sets A2 to F2, which comprise a clear ink composition, provide an increase of about 12% in terms of the chroma area, have excellent color reproducibility, and produce sharp, decolorization-free images.

The increase in chroma area was observed both in YMC color ink sets (ink sets A and B) and in YMCRV color ink sets (ink sets C to F).

In particular, the YMCRV color ink sets had a low pigment solids content (the M and C content was particularly low), and hence possessed excellent graininess, making it possible to ensure improved color reproducibility and improved graininess at the same time.

[Embodiment III]

(Preparation of Emulsion B)

Milky-white emulsion B was obtained in the same manner as emulsion A except that the monomer ratio of styrene, 2-ethylhexyl acrylate, and methacrylic acid was adjusted and the monomers were added so as to raise the Tg above 20° C.

The fine polymer particles in the resulting emulsions B had a Tg of 30° C., an average particle diameter of 130 nm, an Mw of 500,000, an MFT of 40° C., and a turbidity of 30 mg/L or greater.

Clear inks (1) to (3) and color inks (4) to (6) having the following compositions were prepared.

| (Clear Ink (1)) | |
|---|---|
| Polyethyleneimine | 2.5 wt % |
| Emulsion A | 3.3 wt % |
| (Corresponds to 1 wt % in terms of solids) | |
| OLFINE E1010 | 0.5 wt % |
| Glycerol | 20 wt % |
| Ethylene glycol | 10 wt % |
| 1,2-Hexanediol | 5.0 wt % |
| Water | Balance |
| Total | 100 wt % |
| (Clear Ink (2)) | |
| Polyethyleneimine | 2.5 wt % |
| Emulsion B | 3.3 wt % |
| (Corresponds to 1 wt % in terms of solids) | |
| OLFINE E1010 | 0.5 wt % |
| Glycerol | 20 wt % |
| Ethylene glycol | 10 wt % |
| 1,2-Hexanediol | 5.0 wt % |
| Water | Balance |
| Total | 100 wt % |
| (Clear Ink (3)) | |
| OLFINE E1010 | 0.5 wt % |
| Glycerol | 20 wt % |
| Ethylene glycol | 10 wt % |
| 1,2-Hexanediol | 5.0 wt % |
| Water | Balance |
| Total | 100 wt % |

The polyethyleneimine used in clear inks (1) to (3) is shown by Chemical Formula (1-1) below and has a weight-average

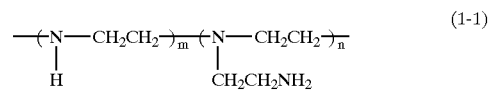

molecular weight (Mw) of 800.

The surface tension of the above-described clear ink compositions was measured by CBVP-Z, which is manufactured by Kyowa Interface Science, and was found to be 25 to 35 dyn/cm for all the inks (1) to (3).

| (Magenta Ink (4)) | |
|---|---|
| Pigment (PR202) | 1.5 wt % |
| Styrene-acrylic copolymer resin (in terms of solids) | 0.5 wt % |
| OLFINE E1010 | 0.5 wt % |
| Glycerol | 20 wt % |
| 1,2-Hexanediol | 5.0 wt % |
| 2-Pyrrolidone | 2 wt % |
| TEA (triethanolamine) | 1 wt % |
| Water | Balance |
| Total | 100 wt % |
| (Yellow Ink (5)) | |
| Pigment (PY74) | 3.0 wt % |
| Styrene-acrylic copolymer resin (in terms of solids) | 1.0 wt % |
| OLFINE E1010 | 0.5 wt % |
| Glycerol | 20 wt % |
| 1,2-Hexanediol | 5.0 wt % |
| 2-Pyrrolidone | 2 wt % |
| TEA (triethanolamine) | 1 wt % |
| Water | Balance |
| Total | 100 wt % |
| (Cyan Ink (6)) | |
| Pigment (PB 15:3) | 1.5 wt % |
| Styrene-acrylic copolymer resin (in terms of solids) | 0.5 wt % |

-continued

| | |
|---|---|
| OLFINE E1010 | 0.5 wt % |
| Glycerol | 20 wt % |
| 1,2-Hexanediol | 5.0 wt % |
| 2-Pyrrolidone | 2 wt % |
| TEA (triethanolamine) | 1 wt % |
| Water | Balance |
| Total | 100 wt % |

[Gloss Test using Specialty Paper]

An inkjet printer (MC-2000, manufactured by Seiko Epson) was used for printing with the clear inks (1) to (3) described above to obtain records at 720×720 dpi and 100% duty on inkjet specialty paper (PM photographic paper manufactured by Seiko Epson). Printing was performed and records obtained at 40% duty under the same conditions. The ejection stability of clear ink was satisfactory.

The recording surfaces of some of the records were also heat-treated at 30° C. with heat rollers.

The gloss of the resulting records was tested in the following manner. GP-200, manufactured by Murakami Color Research Laboratory, was used to measure the maximum value of gloss with an ND10 filter at 12 V and 50 W by setting the standard mirror plate to 42.5 and keeping the incident light aperture at 1 mm, the reflected light aperture at 1.5 mm, the incident angle at 45 degrees, and the fan angle at 0 degrees. It was found that gloss-imparting properties became more pronounced with an increase in the maximum value of gloss.

(Evaluation Criteria)

A: Maximum gloss is 40 or greater
B: Maximum gloss is no less than 30 but less than 40
C: Maximum gloss is no less than 20 but less than 30
D: Maximum gloss is no less than 10 but less than 20
E: Maximum gloss is less than 10

Table 1 shows evaluation results based on these evaluation criteria.

TABLE 8

45-Degree gloss in non-print portions

| | Print duty (%) | |
|---|---|---|
| Clear ink | 40 | 100 |
| 1 | C(C) | B(B) |
| 2 | D(C) | D(B) |
| 3 (Comparative example) | D(D) | C(C) |
| None (comparative example) | E(E) | E(E) |

The letters in parentheses designate cases in which surfaces were heat-treated at 30° C. with heat rollers.

Adequate glossiness was obtained with clear ink (1), as shown in Table 8. In addition, adequate glossiness was also obtained with clear ink (2) by heat-treating the surfaces with heat rollers.

[Coloration Test using Plain Paper]

The clear inks (1) and (3) and color inks (4) to (6) described above were combined together, an inkjet printer (MC-2000, manufactured by Seiko Epson) was used, color inks (4) to (6) were used for printing on plain paper (Xerox 4024) at 720×720 dpi and 70% duty, clear inks (1) to (3) were used for printing at 10% duty at substantially the same time, and records were obtained. Adequate recorded images were obtained in all cases. All the color inks and clear inks had adequate ejection stability.

Optical densities of the resulting records were measured. The densities were measured using GretagMacBeth SPM 50, manufactured by GretagMacBeth, with the aid of a D50 light source at an angle of view of 2° without any filter.

(Evaluation Criteria)

A: Uncolored portions are difficult to identify visually
B: Uncolored portions can be easily identified visually The table below shows evaluation results based on these evaluation criteria.

TABLE 9

| | Color inks | | |
|---|---|---|---|
| Clear inks | Y | M | C |
| 1 | A(1.02) | A(0.71) | A(0.93) |
| 2 | A(1.02) | A(0.71) | A(0.93) |
| 3 (Comparative example) | A(1.02) | A(0.71) | A(0.93) |
| None (comparative example) | B(0.97) | B(0.64) | B(0.87) |

In comparison with cases in which no clear inks were used, using clear inks (1) to (3) made it possible to prevent decolorization on plain paper and endowed recorded images with good coloring properties, as shown in Table 9.

[Embodiment IV]

Clear inks and color inks having the following compositions were prepared.

| (Clear Ink (1)) | |
|---|---|
| Polyethyleneimine | 2.5 wt % |
| Emulsion A | 3.3 wt % |
| (Corresponds to 1 wt % in terms of solids) | |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

| (Clear Ink (2)) | |
|---|---|
| Polyethyleneimine | 2.5 wt % |
| Emulsion B | 3.3 wt % |
| (Corresponds to 1 wt % in terms of solids) | |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

| (Clear Ink (3)) | |
|---|---|
| Polyethyleneimine | 2.5 wt % |
| OLFINE E1010 | 0.5 wt % |
| Glycerol | 20 wt % |
| Ethylene glycol | 20 wt % |
| 1,2-Hexanediol | 5.0 wt % |

| -continued | |
|---|---|
| 2-Pyrrolidone | 2.0 wt % |
| TEA (triethanolamine) | 1.0 wt % |
| Water | Balance |
| Total | 100 wt % |

The polyethyleneimine used above is shown by Chemical Formula (1-1) below and has a weight-average molecular weight (Mw) of 800.

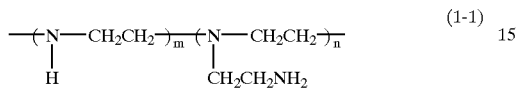
(1-1)

The surface tension of the above-described clear ink compositions was measured by CBVP-Z, which is manufactured by Kyowa Interface Science, and was found to be 25 to 35 dyn/cm for all the inks (1) to (3).

| (Magenta Ink (4)) | |
|---|---|
| Pigment (PR202) | 1.5 wt % |
| Styrene-acrylic copolymer resin (in terms of solids) | 0.5 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Yellow Ink (5)) | |
| Pigment (PY74) | 3.0 wt % |
| Styrene-acrylic copolymer resin (in terms of solids) | 1.0 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Cyan Ink (6)) | |
| Pigment (PB 15:3) | 1.5 wt % |
| Styrene-acrylic copolymer resin (in terms of solids) | 0.5 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Red Ink (7)) | |
| Pigment (PR178) | 2.0 wt % |
| Styrene-acrylic copolymer resin (in terms of solids) | 0.7 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

| -continued | |
|---|---|
| (Violet Ink (8)) | |
| Pigment (PV23) | 2.0 wt % |
| Styrene-acrylic copolymer resin (in terms of solids) | 0.7 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Magenta Ink (9)) | |
| Pigment (PR202) | 6.0 wt % |
| Styrene-acrylic copolymer resin (in terms of solids) | 2.0 wt % |
| OLFINE E1010 | 0.5 wt % |
| Glycerol | 20 wt % |
| Ethylene glycol | 10 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Yellow Ink (10)) | |
| Pigment (PY74) | 6.0 wt % |
| Styrene-acrylic copolymer resin (in terms of solids) | 2.0 wt % |
| OLFINE E1010 | 0.5 wt % |
| Glycerol | 20 wt % |
| Ethylene glycol | 10 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Cyan Ink (11)) | |
| Pigment (PB 15:3) | 4.0 wt % |
| Styrene-acrylic copolymer resin (in terms of solids) | 1.3 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Black Ink (12)) | |
| Pigment (carbon black) | 2.0 wt % |
| Styrene-acrylic copolymer resin (in terms of solids) | 2.0 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Black Ink (13)) | |
| Pigment (carbon black) | 6.0 wt % |
| Styrene-acrylic copolymer resin (in terms of solids) | 2.0 wt % |
| OLFINE E1010 | 0.5 wt % |
| Glycerol | 20 wt % |
| Ethylene glycol | 10 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

The clear inks (1) to (3) described above were combined with color inks (4) to (12) to create the ink sets shown in the table below.

TABLE 10

| | Magenta | Yellow | Cyan | Red | Violet | Black | Clear ink |
|---|---|---|---|---|---|---|---|
| Ink set A | (9) | (10) | (11) | — | — | — | (1) |
| Ink set B | (4) | (5) | (6) | — | — | (12) | (2) |
| Ink set C | (4) | (5) | (6) | (7) | (8) | (12) | (1) |
| Ink set D | (4) | (5) | (6) | (7) | (8) | (12) | (2) |
| Ink set E (comparative example) | (4) | (5) | (6) | (7) | (8) | (12) | (3) |
| Ink set F (comparative example) | (9) | (10) | (11) | — | — | — | — |
| Ink set G (comparative example) | (4) | (5) | (6) | — | — | (12) | — |
| Ink set H (comparative example) | (4) | (5) | (6) | (7) | (8) | (12) | — |

[Gloss Test using PM Photographic Paper]

An inkjet printer (MC-2000, manufactured by Seiko Epson) was used with the ink sets of Table 10 for printing on inkjet specialty paper (PM photographic paper manufactured by Seiko Epson) at 720×720 dpi. Adequate recorded images and ink ejection stability were obtained.

Print patterns were used in a manner such that the single color of each of the color inks (including the black ink) and the mixed colors of two or more types of ink were adjusted to a total duty of 0% (non-print portions), 10%, 20%, 40%, or 100%.

The following two types of printing were performed using clear inks.

1. Clear print duty of 20%: clear ink was deposited at uniform 20% duty in areas that had a print duty of 20% or less, and 2. Clear print duty of 40%: clear ink was deposited at uniform 40% duty in areas that had a print duty of 40% or less.

The recording surfaces of some of the records were also heat-treated at 80° C. with heat rollers.

The gloss of the resulting records was tested in the following manner. GP-200, manufactured by Murakami Color Research Laboratory, was used to measure the maximum value of gloss with an ND10 filter at 12 V and 50 W by setting the standard mirror plate to 42.5 and keeping the incident light aperture at 1 mm, the reflected light aperture at 1.5 mm, the incident angle at 45 degrees, and the fan angle at 0 degrees. It was found that gloss-imparting properties became more pronounced with an increase in the maximum value of gloss.

(Evaluation Criteria)
A: Maximum gloss is 40 or greater
B: Maximum gloss is no less than 30 but less than 40
C: Maximum gloss is no less than 20 but less than 30
D: Maximum gloss is no less than 10 but less than 20
E: Maximum gloss is less than 10

Human images that conformed to ISO 400 were printed by the same printing method as above, and the gloss state was visually evaluated in the manner described below.

(Evaluation Criteria)
Excellent: Uniformly high shine is obtained.
Good: Substantially uniform shine is obtained, but some areas have low gloss, conveying a subtle perception of low quality
Poor: The gloss is nonuniform, a perception of low quality is conveyed Table 11 shows evaluation results based on these evaluation criteria.

TABLE 11

| | Clear print duty | 0%, non-print portions | 10% | 20% | 40% | 100% | Gloss state |
|---|---|---|---|---|---|---|---|
| Ink set A | 20% | A | A | A | D | D | Good |
| | 40% | A | A | A | D | D | Good |
| Ink set B | 20% | B(A) | B(A) | A | A | A | Good (excellent) |
| | 40% | B(A) | B(A) | B | A | A | Good (excellent) |
| Ink set C | 20% | A | A | A | A | A | Excellent |
| | 40% | A | A | A | A | A | Excellent |
| Ink set D | 20% | B(A) | B(A) | A | A | A | Good (excellent) |
| | 40% | B(A) | B(A) | B(A) | A | A | Good (excellent) |
| Ink set E (comparative example) | 20% | B | A | A | A | A | Good |
| | 40% | B | A | A | A | A | Good |
| Ink set F (comparative example) | — | E | C | C | D | D | Poor |
| Ink set G (comparative example) | — | E | B | B | A | A | Poor |
| Ink set H (comparative example) | — | E | B | B | A | A | Poor |

The letters in parentheses designate cases in which surfaces were heat-treated at 80° C. with heat rollers.

The glossiness of non-print portions (0% duty portions) was improved by using clear ink (1) or (2) for printing, as shown in Table 11. In addition, differences in glossiness between non-print portions and high-duty portions were reduced.

[Coloration Test using Plain Paper]

The ink sets A2 to H2 shown in Table 12 were used by an inkjet printer (MC-2000, manufactured by Seiko Epson) on plain paper (Xerox 4024) at 720×720 dpi, color ink compositions were used for printing at 70% duty, clear inks were used for printing at 10% duty at substantially the same time, and records were obtained. Adequate recorded images were obtained in all cases. All the color inks and clear inks had adequate ejection stability.

TABLE 12

| | Magenta | Yellow | Cyan | Red | Violet | Black | Clear ink |
|---|---|---|---|---|---|---|---|
| Ink set A2 | (9) | (10) | (11) | — | — | (13) | (1) |
| Ink set B2 | (4) | (5) | (6) | — | — | (13) | (2) |
| Ink set C2 | (4) | (5) | (6) | (7) | (8) | (13) | (1) |
| Ink set D2 | (4) | (5) | (6) | (7) | (8) | (13) | (2) |
| Ink set E2 (comparative example) | (4) | (5) | (6) | (7) | (8) | (13) | (3) |

TABLE 12-continued

|  | Magenta | Yellow | Cyan | Red | Violet | Black | Clear ink |
|---|---|---|---|---|---|---|---|
| Ink set F2 (comparative example) | (9) | (10) | (11) | — | — | (13) | — |
| Ink set G2 (comparative example) | (4) | (5) | (6) | — | — | (13) | — |
| Ink set H2 (comparative example) | (4) | (5) | (6) | (7) | (8) | (13) | — |

Optical densities of the resulting records were measured. The densities were measured using GretagMacBeth SPM 50, manufactured by GretagMacBeth, with the aid of a D50 light source at an angle of view of 2° without any filter.

(Evaluation Criteria)
A: Uncolored portions are difficult to identify visually
B: Uncolored portions can be easily identified visually

[Measurement of Chroma Area using Plain Paper]
Optical densities of the resulting records were measured. The densities were measured using GretagMacBeth SPM 50, manufactured by GretagMacBeth, with the aid of a D50 light source at an angle of view of 2° without any filter; and the chroma area was measured in a case in which a surface area of 1 was assigned to a region comprising a=1 and b=1 in the L*a*b* calorimetric system defined by CIE.

Table 13 shows evaluation results based on these evaluation criteria.

it possible to ensure improved color reproducibility and improved graininess at the same time.

[Embodiment V]

Clear inks (1) to (3) and color inks (4) to (6) having the following compositions were prepared.

(Clear Ink (1))

| Polyethyleneimine | 2.5 wt % |
|---|---|
| Emulsion D (in terms of solids) | 1.0 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Clear Ink (2))

| Polyethyleneimine | 2.5 wt % |
|---|---|
| Emulsion D (in terms of solids) | 2.0 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

TABLE 13

|  | Chroma area | M(9) Dm | Y(10) Dy | C(11) Dc | M(4) Dm | Y(5) Dy | C(6) Dc | K(13) Dk | R(7) Dm | R(7) Dy | V(8) Dm | V(8) Dc |
|---|---|---|---|---|---|---|---|---|---|---|---|---|
| Ink set A2 | 7490 | A(1.23) | A(1.16) | A(1.17) | — | — | — | A(1.51) | — | — | — | — |
| Ink set B2 | 5010 | — | — | — | A(1.02) | A(0.71) | A(0.93) | A(1.51) | — | — | — | — |
| Ink set C2 | 7650 | — | — | — | A(1.02) | A(0.71) | A(0.93) | A(1.51) | A(0.79) | A(0.94) | A(0.99) | A(1.10) |
| Ink set D2 | 7650 | — | — | — | A(1.02) | A(0.71) | A(0.93) | A(1.51) | A(0.79) | A(0.94) | A(0.99) | A(1.10) |
| Ink set E2 (comparative example) | 7650 | — | — | — | A(1.02) | A(0.71) | A(0.93) | A(1.51) | A(0.79) | A(0.94) | A(0.99) | A(1.10) |
| Ink set F2 (comparative example) | 6660 | B(1.18) | B(1.11) | B(1.13) | — | — | — | B(1.45) | — | — | — | — |
| Ink set G2 (comparative example) | 4470 | — | — | — | B(0.97) | B(0.64) | B(0.87) | B(1.45) | — | — | — | — |
| Ink set H2 (comparative example) | 6820 | — | — | — | B(0.97) | B(0.64) | B(0.87) | B(1.45) | B(0.74) | B(0.89) | B(0.94) | B(1.06) |

Ink sets A2 to D2, which comprise clear ink (1) or (2), prevent decolorization on plain paper and endow recorded images with good coloring properties, as shown in Table 13.

In comparison with ink sets E2 to H2 (comparative examples), ink sets A2 to D2, which comprise a clear ink composition, provide an increase of about 12% in terms of the chroma area, have excellent color reproducibility, and produce sharp, decolorization-free images.

The increase in chroma area was observed both in YMC color ink sets and in YMCRV color ink sets.

In particular, the YMCRV color ink sets had a low pigment solids content (the M and C content was particularly low), and hence possessed excellent graininess, making -continued (Clear Ink (3))

| Polyethyleneimine | 2.5 wt % |
|---|---|
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

The polyethyleneimine used in clear inks (1) to (3) is shown by Chemical Formula (1-1) below and has a weight-average molecular weight (Mw) of 800.

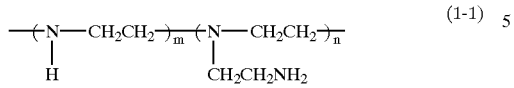

The surface tension of the above-described clear ink compositions was measured by CBVP-Z, which is manufactured by Kyowa Interface Science, and was found to be 25 to 35 dyn/cm (Magenta Ink (4))

| | |
|---|---|
| Pigment (PR202) | 1.5 wt % |
| Styrene-acrylic copolymer resin (in terms of solids) | 0.5 wt % |
| OLFINE E1010 | 0.5 wt % |
| Glycerol | 25 to 35 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Yellow Ink (5))

| | |
|---|---|
| Pigment (PY74) | 3.0 wt % |
| Styrene-acrylic copolymer resin (in terms of solids) | 1.0 wt % |
| OLFINE E1010 | 0.5 wt % |
| Glycerol | 25 to 35 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Cyan Ink (6))

| | |
|---|---|
| Pigment (PB 15:3) | 1.5 wt % |
| Styrene-acrylic copolymer resin (in terms of solids) | 0.5 wt % |
| E1010 | 0.5 wt % |
| Glycerol | 25 to 35 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

[Gloss Test using Specialty Paper]

An inkjet printer (MC-2000, manufactured by Seiko Epson) was used for printing with clear inks (1) to (3) to obtain records at 720×720 dpi and 100% duty on inkjet specialty paper (PM photographic paper manufactured by Seiko Epson).

Printing was performed and records obtained at 40% duty under the same conditions. The ejection stability of clear ink was satisfactory.

The gloss of the resulting records was tested in the following manner. GP-200, manufactured by Murakami Color Research Laboratory, was used to measure the maximum value of gloss with an ND10 filter at 12 V and 50 W by setting the standard mirror plate to 42.5 and keeping the incident light aperture at 1 mm, the reflected light aperture at 1.5 mm, the incident angle at 45 degrees, and the fan angle at 0 degrees. It was found that gloss-imparting properties became more pronounced with an increase in the maximum value of gloss.

(Evaluation Criteria)
A: Maximum gloss is 40 or greater
B: Maximum gloss is no less than 30 but less than 40
C: Maximum gloss is no less than 20 but less than 30
D: Maximum gloss is no less than 10 but less than 20
E: Maximum gloss is less than 10

Table 14 shows evaluation results based on these evaluation criteria.

TABLE 14

45-Degree gloss in non-print portions

| | Print duty (%) | |
|---|---|---|
| Clear ink | 40 | 100 |
| (1) | A | B |
| (2) | A | C |
| (3) (Comparative example) | C | C |
| None (comparative example) | E | E |

Adequate glossiness was obtained with clear inks (1) and (2), as shown in Table 14.

[Coloration Test using Plain Paper]

The clear inks (1) and (3) and color inks (4) to (6) described above were combined together, an inkjet printer (MC-2000, manufactured by Seiko Epson) was used, color inks (4) to (6) were used for printing on plain paper (Xerox 4024) at 720×720 dpi and 70% duty, clear inks (1) to (3) were used for printing at 10% duty at substantially the same time, and records were obtained. Adequate recorded images were obtained in all cases. All the color inks and clear inks had adequate ejection stability.

Optical densities of the resulting records were measured. The densities were measured using GretagMacBeth SPM 50, manufactured by GretagMacBeth, with the aid of a D50 light source at an angle of view of 2° without any filter.

(Evaluation Criteria)
A: Uncolored portions are difficult to identify visually
B: Uncolored portions can be easily identified visually Table 15 below shows evaluation results based on these evaluation criteria.

TABLE 15

| | Color inks | | |
|---|---|---|---|
| Clear inks | Y | M | C |
| (1) | A(1.02) | A(0.71) | A(0.93) |
| (2) | A(1.02) | A(0.71) | A(0.93) |
| (3) (Comparative example) | A(1.02) | A(0.71) | A(0.93) |
| None (comparative example) | B(0.97) | B(0.64) | B(0.87) |

In comparison with cases in which no clear inks were used, using clear inks (1) to (3) made it possible to prevent decolorization on plain paper and endowed recorded images with good coloring properties, as shown in Table 15.

[Embodiment VI]

Clear inks (1) to (3) and color inks (4) to (6) having the following compositions were prepared.

(Clear Ink (1))

| | |
|---|---|
| Polyethyleneimine | 2.5 wt % |
| Emulsion C | 6.7 wt % |
| (Corresponds to 1 wt % in terms of solids) | |
| OLFINE E1010 | 0.5 wt % |
| Glycerol | 20 wt % |
| Ethylene glycol | 20 wt % |
| 1,2-Hexanediol | 5.0 wt % |

|  |  |
|---|---|
| 2-Pyrrolidone | 2.0 wt % |
| TEA (triethanolamine) | 1.0 wt % |
| Water | Balance |
| Total | 100 wt % |
| (Clear Ink (2)) | |
| Polyethyleneimine | 2.5 wt % |
| Emulsion C (Corresponds to 2 wt % in terms of solids) | 13.4 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Clear Ink (3)) | |
| Polyethyleneimine | 2.5 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

The polyethyleneimine used in clear inks (1) to (3) is shown by Chemical Formula (1-1) below and has a weight-average molecular weight (Mw) of 800.

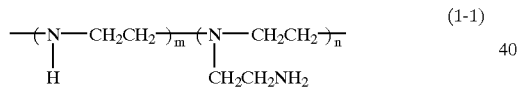

(1-1)

The surface tension of the above-described clear ink compositions was measured by CBVP-Z, which is manufactured by Kyowa Interface Science, and was found to be 25 to 35 dyn/cm in (1) to (3).

|  |  |
|---|---|
| (Magenta Ink (4)) | |
| Pigment (PR202) | 1.5 wt % |
| Styrene-acrylic copolymer resin (in terms of solids) | 0.5 wt % |
| OLFINE E1010 | 0.5 wt % |
| Glycerol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Yellow Ink (5)) | |
| Pigment (PY74) | 3.0 wt % |
| Styrene-acrylic copolymer resin (in terms of solids) | 1.0 wt % |
| OLFINE E1010 | 0.5 wt % |
| Glycerol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |
| (Cyan Ink (6)) | |
| Pigment (PB 15:3) | 1.5 wt % |
| Styrene-acrylic copolymer resin (in terms of solids) | 0.5 wt % |
| E1010 | 0.5 wt % |
| Glycerol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

[Gloss Test using Specialty Paper]

An inkjet printer (MC-2000, manufactured by Seiko Epson) was used for printing with the clear inks (1) to (3) described above to obtain records at 720×720 dpi and 100% duty on inkjet specialty paper (PM photographic paper manufactured by Seiko Epson).

Printing was performed and records obtained at 40% duty under the same conditions. The ejection stability of clear ink was satisfactory.

The gloss of the resulting records was tested in the following manner. GP-200, manufactured by Murakami Color Research Laboratory, was used to measure the maximum value of gloss with an ND10 filter at 12 V and 50 W by setting the standard mirror plate to 42.5 and keeping the incident light aperture at 1 mm, the reflected light aperture at 1.5 mm, the incident angle at 45 degrees, and the fan angle at 0 degrees. It was found that gloss-imparting properties became more pronounced with an increase in the maximum value of gloss.

(Evaluation Criteria)
A: Maximum gloss is 40 or greater
B: Maximum gloss is no less than 30 but less than 40
C: Maximum gloss is no less than 20 but less than 30
D: Maximum gloss is no less than 10 but less than 20
E: Maximum gloss is less than 10

Table 16 shows evaluation results based on these evaluation criteria.

TABLE 16

| | 45-Degree gloss in non-print portions | |
|---|---|---|
| | Print duty (%) | |
| Clear ink | 40 | 100 |
| (1) | A | A |
| (2) | A | B |
| (3) (Comparative example) | C | C |
| None (comparative example) | E | E |

Adequate glossiness was obtained with clear inks (1) and (2), as shown in Table 16.

[Coloration Test using Plain Paper]

The clear inks (1) and (3) and color inks (4) to (6) described above were combined together, an inkjet printer (MC-2000, manufactured by Seiko Epson) was used, color inks (4) to (6) were used for printing on plain paper (Xerox 4024) at 720×720 dpi and 70% duty, clear inks (1) to (3) were used for printing at 10% duty at substantially the same time, and records were obtained. Adequate recorded images were obtained in all cases. All the color inks and clear inks had adequate ejection stability.

Optical densities of the resulting records were measured. The densities were measured using GretagMacBeth SPM 50, manufactured by GretagMacBeth, with the aid of a D50 light source at an angle of view of 2° without any filter.

(Evaluation Criteria)

A: Uncolored portions are difficult to identify visually
B: Uncolored portions can be easily identified visually Table 17 below shows evaluation results based on these evaluation criteria.

TABLE 17

|  | Color inks | | |
| --- | --- | --- | --- |
| Clear inks | Y | M | C |
| (1) | A(1.02) | A(0.71) | A(0.93) |
| (2) | A(1.02) | A(0.71) | A(0.93) |
| (3) (Comparative example) | A(1.02) | A(0.71) | A(0.93) |
| None (comparative example) | B(0.97) | B(0.64) | B(0.87) |

In comparison with cases in which no clear inks were used, using clear inks (1) to (3) made it possible to prevent decolorization on plain paper and endowed recorded images with good coloring properties, as shown in Table 17.

[Embodiment VII]

Clear inks and color inks having the following compositions were prepared.

(Clear Ink (1))

| Polyethyleneimine | 2.5 wt % |
| --- | --- |
| Emulsion D | 3.3 wt % |
| (Corresponds to 1 wt % in terms of solids) | |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Clear Ink (2))

| Polyethyleneimine | 2.5 wt % |
| --- | --- |
| Emulsion C | 3.3 wt % |
| (Corresponds to 1 wt % in terms of solids) | |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Clear Ink (3))

| Polyethyleneimine | 2.5 wt % |
| --- | --- |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

The polyethyleneimine used above is shown by Chemical Formula (1-1) below and has a weight-average molecular weight

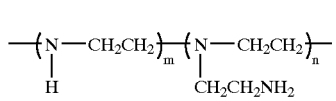

(1-1)

(Mw) of 800.

The surface tension of the above-described clear ink compositions was measured by CBVP-Z, which is manufactured by Kyowa Interface Science, and was found to be 25 to 35 dyn/cm for all the inks (1) to (3).

(Magenta Ink (4))

| Pigment (PR202) | 1.5 wt % |
| --- | --- |
| Styrene-acrylic copolymer resin (in terms of solids) | 0.5 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Yellow Ink (5))

| Pigment (PY74) | 3.0 wt % |
| --- | --- |
| Styrene-acrylic copolymer resin (in terms of solids) | 1.0 wt % |
| OLFINE E1010 | 0.5 wt % |
| Glycerol | 20 wt % |
| Ethylene glycol | 20 wt % |
| 1,2-hexanediol | 5.0 wt % |
| 2-Pyrrolidone | 2.0 wt % |
| TEA (triethanolamine) | 1.0 wt % |
| Water | Balance |
| Total | 100 wt % |

(Cyan Ink (6))

| Pigment (PB 15:3) | 1.5 wt % |
| --- | --- |
| Styrene-acrylic copolymer resin (in terms of solids) | 0.5 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Red Ink (7))

| Pigment (PR178) | 2.0 wt % |
| --- | --- |
| Styrene-acrylic copolymer resin (in terms of solids) | 0.7 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Violet Ink (8))

| Pigment (PV23) | 2.0 wt % |
| --- | --- |
| Styrene-acrylic copolymer resin (in terms of solids) | 0.7 wt % |
| OLFINE E1010 | 0.5 wt % |
| Glycerol | 20 wt % |
| Ethylene glycol | 20 wt % |

-continued

| | |
|---|---|
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Magenta Ink (9))

| | |
|---|---|
| Pigment (PR202) | 6.0 wt % |
| Styrene-acrylic copolymer resin (in terms of solids) | 2.0 wt % |
| OLFINE E1010 | 0.5 wt % |
| Glycerol | 20 wt % |
| Ethylene glycol | 10 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Yellow Ink (10))

| | |
|---|---|
| Pigment (PY74) | 6.0 wt % |
| Styrene-acrylic copolymer resin (in terms of solids) | 2.0 wt % |
| OLFINE E1010 | 0.5 wt % |
| Glycerol | 20 wt % |
| Ethylene glycol | 10 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Cyan Ink (11))

| | |
|---|---|
| Pigment (PB 15:3) | 4.0 wt % |
| Styrene-acrylic copolymer resin (in terms of solids) | 1.3 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Black Ink (12))

| | |
|---|---|
| Pigment (carbon black) | 2.0 wt % |
| Styrene-acrylic copolymer resin (in terms of solids) | 2.0 wt % |
| OLFINE E1010 | 0.5 wt % |
| Glycerol | 20 wt % |
| Ethylene glycol | 20 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

(Black Ink (13))

| | |
|---|---|
| Pigment (carbon black) | 6.0 wt % |
| Styrene-acrylic copolymer resin (in terms of solids) | 2.0 wt % |
| OLFINE E1010 | 0.5 wt % |
| Glycerol | 20 wt % |
| Ethylene glycol | 10 wt % |
| 1,2-Hexanediol | 5.0 wt % |
| 2-Pyrrolidone | 2.0 wt % |
| TEA (triethanolamine) | 1.0 wt % |
| Water | Balance |
| Total | 100 wt % |

Clear inks (1) to (3) were combined with the color inks (4) to (12) described above to create the ink sets shown in Table 18.

TABLE 18

| | Magenta | Yellow | Cyan | Red | Violet | Black | Clear ink |
|---|---|---|---|---|---|---|---|
| Ink set A | (9) | (10) | (11) | — | — | — | (1) |
| Ink set B | (4) | (5) | (6) | — | — | (12) | (2) |
| Ink set C | (4) | (5) | (6) | (7) | (8) | (12) | (1) |
| Ink set D | (4) | (5) | (6) | (7) | (8) | (12) | (2) |
| Ink set E | (4) | (5) | (6) | (7) | (8) | (12) | (3) |
| Ink set F (comparative example) | (9) | (10) | (11) | — | — | — | — |
| Ink set G (comparative example) | (4) | (5) | (6) | — | — | (12) | — |
| Ink set H (comparative example) | (4) | (5) | (6) | (7) | (8) | (12) | — |

[Gloss Test using PM Photographic Paper]

An inkjet printer (MC-2000, manufactured by Seiko Epson) was used with the ink sets of Table 18 for printing on inkjet specialty paper (PM photographic paper manufactured by Seiko Epson) at 720×720 dpi. Adequate recorded images and ink ejection stability were obtained.

Print patterns were used in a manner such that the single color of each of the color inks (including the black ink) and the mixed colors of two or more types of ink were adjusted to a total duty of 0% (non-print portions), 10%, 20%, 40%, or 100%.

The following two types of printing were performed using clear inks.

1. Clear print duty of 20%: clear ink was deposited at uniform 20% duty in areas that had a print duty of 20% or less, and 2. Clear print duty of 40%: clear ink was deposited at uniform 40% duty in areas that had a print duty of 40% or less.

The gloss of the resulting records was tested in the following manner. GP-200, manufactured by Murakami Color Research Laboratory, was used to measure the maximum value of gloss with an ND10 filter at 12 V and 50 W by setting the standard mirror plate to 42.5 and keeping the incident light aperture at 1 mm, the reflected light aperture at 1.5 mm, the incident angle at 45 degrees, and the fan angle at 0 degrees. It was found that gloss-imparting properties became more pronounced with an increase in the maximum value of gloss.

(Evaluation Criteria)

A: Maximum gloss is 40 or greater
B: Maximum gloss is no less than 30 but less than 40
C: Maximum gloss is no less than 20 but less than 30
D: Maximum gloss is no less than 10 but less than 20
E: Maximum gloss is less than 10

Human images that conformed to ISO 400 were printed by the same printing method as above, and the gloss state was visually evaluated in the manner described below.

(Evaluation Criteria)

Excellent: Uniformly high shine is obtained.
Good: Substantially uniform shine is obtained, but some areas have low gloss, conveying a subtle perception of low quality
Poor: The gloss is nonuniform, a perception of low quality is conveyed Table 19 shows evaluation results based on these evaluation criteria.

TABLE 19

| | Clear print duty | 0%, non-print portions | 10% | 20% | 40% | 100% | Gloss state |
|---|---|---|---|---|---|---|---|
| Ink set A | 20% | A | A | A | D | D | Good |
| | 40% | A | A | A | D | D | Good |
| Ink set B | 20% | A | A | A | A | A | Good * |
| | 40% | A | A | A | A | A | Good * |
| Ink set C | 20% | A | A | A | A | A | Excellent |
| | 40% | A | A | A | A | A | Excellent |
| Ink set D | 20% | A | A | A | A | A | Excellent |
| | 40% | A | A | A | A | A | Excellent |
| Ink set E (comparative example) | 20% | C | A | A | A | A | Good |
| | 40% | C | A | A | A | A | Good |
| Ink set F (comparative example) | — | E | C | C | D | D | Poor |
| Ink set G (comparative example) | — | E | B | B | A | A | Poor |
| Ink set H (comparative example) | — | E | B | B | A | A | Poor |

Asterisks designate cases in which a perception of low quality is believed to be conveyed because of the high overall print duty.

Glossiness was improved by using clear ink (1) or (2) for printing, as shown in Table 19. In addition, the glossiness of low-duty portions was improved and the differences in glossiness from high-duty portions were reduced.

[Coloration Test using Plain Paper]

The ink sets A2 to H2 shown in Table 20 were used by an inkjet printer (MC-2000, manufactured by Seiko Epson) on plain paper (Xerox 4024) at 720×720 dpi, color ink compositions were used for printing at 70% duty, clear inks were used for printing at 10% duty at substantially the same time, and records were obtained. Adequate recorded images were obtained in all cases. All the color inks and clear inks had adequate ejection stability.

TABLE 20

| | Magenta | Yellow | Cyan | Red | Violet | Black | Clear ink |
|---|---|---|---|---|---|---|---|
| Ink set A2 | (9) | (10) | (11) | — | — | (13) | (1) |
| Ink set B2 | (4) | (5) | (6) | — | — | (13) | (2) |
| Ink set C2 | (4) | (5) | (6) | (7) | (8) | (13) | (1) |
| Ink set D2 | (4) | (5) | (6) | (7) | (8) | (13) | (2) |
| Ink set E2 (comparative example) | (4) | (5) | (6) | (7) | (8) | (13) | (3) |
| Ink set F2 (comparative example) | (9) | (10) | (11) | — | — | (13) | — |
| Ink set G2 (comparative example) | (4) | (5) | (6) | — | — | (13) | — |
| Ink set H2 (comparative example) | (4) | (5) | (6) | (7) | (8) | (13) | — |

Optical densities of the resulting records were measured. The densities were measured using GretagMacBeth SPM 50, manufactured by GretagMacBeth, with the aid of a D50 light source at an angle of view of 2° without any filter.

(Evaluation Criteria)

A: Uncolored portions are difficult to identify visually

B: Uncolored portions can be easily identified visually

[Measurement of Chroma Area using Plain Paper]

Optical densities of the resulting records were measured. The densities were measured using GretagMacBeth SPM 50, manufactured by GretagMacBeth, with the aid of a D50 light source at an angle of view of 2° without any filter; and the chroma area was measured in a case in which a surface area of 1 was assigned to a region comprising a=1 and b=1 in the L*a*b* colorimetric system defined by CIE.

Table 21 shows evaluation results based on these evaluation criteria.

TABLE 21

| | Chroma area | M(9) Dm | Y(10) Dy | C(11) Dc | M(4) Dm | Y(5) Dy | C(6) Dc | K(13) Dk | R(7) Dm | R(7) Dy | V(8) Dm | V(8) Dc |
|---|---|---|---|---|---|---|---|---|---|---|---|---|
| Ink set A2 | 7490 | A(1.23) | A(1.16) | A(1.17) | — | — | — | A(1.51) | — | — | — | — |
| Ink set B2 | 5010 | — | — | — | A(1.02) | A(0.71) | A(0.93) | A(1.51) | — | — | — | — |
| Ink set C2 | 7650 | — | — | — | A(1.02) | A(0.71) | A(0.93) | A(1.51) | A(0.79) | A(0.94) | A(0.99) | A(1.10) |
| Ink set D2 | 7650 | — | — | — | A(1.02) | A(0.71) | A(0.93) | A(1.51) | A(0.79) | A(0.94) | A(0.99) | A(1.10) |
| Ink set E2 (comparative example) | 7650 | — | — | — | A(1.02) | A(0.71) | A(0.93) | A(1.51) | A(0.79) | A(0.94) | A(0.99) | A(1.10) |
| Ink set F2 (comparative example) | 6660 | B(1.18) | B(1.11) | B(1.13) | — | — | — | B(1.45) | — | — | — | — |
| Ink set G2 (comparative example) | 4470 | — | — | — | B(0.97) | B(0.64) | B(0.87) | B(1.45) | — | — | — | — |
| Ink set H2 (comparative example) | 6820 | — | — | — | B(0.97) | B(0.64) | B(0.87) | B(1.45) | B(0.74) | B(0.89) | B(0.94) | B(1.06) |

Ink sets A2 to D2, which comprise clear ink composition (1) or (2), prevent decolorization on plain paper and endow recorded images with good coloring properties, as shown in Table 21.

In comparison with ink sets E2 to H2 (comparative examples), ink sets A2 to D2, which comprise a clear ink composition, provide an increase of about 12% in terms of the chroma area, have excellent color reproducibility, and produce sharp, decolorization-free images.

The increase in chroma area was observed both in YMC color ink sets and in YMCRV color ink sets.

In particular, the YMCRV color ink sets had a low pigment solids content (the M and C content was particularly low), and hence possessed excellent graininess, making it possible to ensure improved color reproducibility and improved graininess at the same time.

With the clear ink set, ink cartridge, ink set, and method for producing an inkjet record of the present invention, it is possible to obtain high-quality images that have excellent coloring properties and glossiness in the recorded images.

Using the clear ink composition of the present invention allows such a clear ink composition to be used for printing in non-print portions and low-duty portions based on a color ink composition, and makes it possible to improve the glossiness of the non-print portions and low-duty portions, particularly when specialty paper is used.

In addition, color reproducibility is markedly improved when plain paper is used.

Consequently, using the clear ink composition of the present invention makes it possible to improve glossiness on specialty paper, and coloring properties on plain paper at the same time.

In addition, the clear ink composition of the present invention has excellent storage properties.

What is claimed is:

1. A clear ink composition comprising water, a cationic resin and fine polymer particles, but no colorant, wherein the fine polymer particles form an emulsion in the clear ink composition and have an average particle diameter of 70 nm or less, and, wherein the fine polymer particles comprise a copolymer obtained by polymerizing an ethylenic unsaturated carboxylic acid monomer and another monomer copolymerizable therewith, in the presence of a copolymerizable surfactant or a water-soluble macromolecular compound containing alcoholic hydroxyl groups.

2. The clear ink composition according to claim 1, wherein the glass transition temperature Tg, measured according to JIS K6900, of the fine polymer particles is 70° C. or less.

3. The clear ink composition according to claim 1, wherein the pH of the copolymer is adjusted with the aid of a base.

4. The clear ink composition according to claim 3, wherein the base is an inorganic base.

5. The clear ink composition according to claim 4, wherein the inorganic base is an alkali metal hydroxide or alkaline-earth metal hydroxide.

6. The clear ink composition according to claim 1, wherein the acid value of the copolymer is 40 or less.

7. The clear ink composition according to claim 1, wherein the water-soluble macromolecular compound containing alcoholic hydroxyl groups is a vinyl alcohol polymer.

8. The clear ink composition according to claim 1, wherein the ethylenic unsaturated carboxylic acid monomer is acrylic acid or methacrylic acid.

9. The clear ink composition according to claim 1, wherein the other monomer copolymerizable with the ethylenic unsaturated carboxylic acid monomer is an ethylenic unsaturated carboxylic acid ester monomer.

10. The clear ink composition according to claim 1, wherein the weight-average molecular weight (Mw) of the fine polymer particles is between 1000 and 1,000,000, inclusive.

11. The clear ink composition according to claim 1, wherein the weight-average molecular weight (Mw) of the fine polymer particles is between 800 and 20,000, inclusive.

12. The clear ink composition according to claim 1, wherein the pH of the fine polymer particles is between 8 and 11, inclusive.

13. The clear ink composition according to claim 1, wherein the pH of the fine polymer particles is between 9 and 10, inclusive.

14. The clear ink composition according to claim 1, wherein the turbidity of the fine polymer particles is 30 mg/L or less.

15. The clear ink composition according to claim 1, wherein the minimum film formation temperature (MFT) of the fine polymer particles is 20° C. or less.

16. The clear ink composition according to claim 1, wherein the content of the fine polymer particles in the clear ink composition is between 0.1 wt % and 5.0 wt %, inclusive.

17. A clear ink composition comprising water, a cationic resin and fine polymer particles, but no colorant, wherein the fine polymer particles form an emulsion in the clear ink composition and have an average particle diameter of 70 nm or less, and, wherein the fine polymer particles are fine polymer particles comprising a polymer that contains sulfonic acid groups.

18. The clear ink composition according to claim 17, wherein the polymer that contains sulfonic acid groups is a polymer containing diene-based sulfonic acid groups and/or a polymer that contains non-diene sulfonic acid groups.

19. The clear ink composition according to claim 18, wherein the polymer that contains non-diene sulfonic acid groups is a polymer containing acrylic sulfonic acid groups.

20. The clear ink composition according to claim 17, wherein the acid value of the fine polymer particles is 100 or greater.

21. The clear ink composition according to claim 17, wherein the weight-average molecular weight (Mw) of the fine polymer particles is between 8,000 and 20,000, inclusive, and the glass transition temperature (Tg; measured according to JIS K6900) is between 5° C. and 50° C., inclusive.

22. The clear ink composition according to claim 17, wherein the minimum film formation temperature (MFT) of the fine polymer particles is 20° C. or less.

23. The clear ink composition according to claim 17, wherein the content of the fine polymer particles in the clear ink composition is between 0.1 wt % and 5.0 wt %, inclusive.

24. The clear ink composition according to claim 1 or 17, wherein the cationic resin is a resin that contains amino groups.

25. The clear ink composition according to claim 1 or 17, wherein the cationic resin is polyethyleneimine.

26. The clear ink composition according to claim 25, wherein the polyethyleneimine is a macromolecule containing at least one type of repeating units expressed by General Formula (1)

wherein R is hydrogen, an optionally substituted alkyl group, an optionally substituted aryl group, an optionally substituted pyridyl group, an optionally substituted alkylamino group, or an optionally substituted hydrazino group.

27. The clear ink composition according to claim 25, wherein the weight-average molecular weight (Mw) of the polyethyleneimine is 100,000 or less.

28. The ink composition according to claim 1 or 17, wherein the cationic resin is a polymer of a single monomer or a copolymer of a plurality of monomers comprising at least one compound selected from the group consisting of dimethylaminoethyl methacrylate (DM), methacryloyloxyethyl trimethylammonium chloride (DMC), methacryloyloxyethyl benzyl dimethylammonium chloride (DMBC), dimethylaminoethyl acrylate (DA), acryloyloxyethyl trimethylammonium chloride (DMQ), acryloyloxyethyl benzyl dimethylammonium chloride (DABC), dimethylaminopropyl acrylamide (DMAPAA), and acrylamidopropyl trimethylammonium chloride (DMAPAAQ).

29. The clear ink composition according to claim 1 or 17, wherein the content of the cationic resin in the clear ink composition is between 0.1 wt % and 30.0 wt %, inclusive.

30. The clear ink composition according to claim 1 or 17, further comprising an acetylene glycol compound, acetylene alcohol compound, or polysiloxane compound as a surfactant.

31. The clear ink composition according to claim 1 or 17, wherein the surface tension is between 15 dyn/cm and 45 dyn/cm, inclusive.

32. The clear ink composition according to claim 1 or 17, further comprising a glycol ether compound or alkyl diol compound.

33. The clear ink composition according to claim 32, wherein the glycol ether compound is triethylene glycol monobutyl ether.

34. The clear ink composition according to claim 32, wherein the alkyl diol compound is 1,2-hexanediol.

35. The clear ink composition according to claim 1 or 17, further comprising a polyhydric alcohol compound.

36. The clear ink composition according to claim 35, wherein the polyhydric alcohol compound is glycerol or ethylene glycol.

37. The clear ink composition according to claim 1 or 17, used for inkjet recording.

38. An ink cartridge containing the clear ink composition according to claim 1 or 17.

39. An ink set, comprising the clear ink composition according to claim 1 or 17; and at least a yellow ink composition, a magenta ink composition, and a cyan ink composition.

40. The ink set according to claim 39, further comprising a red ink composition whose hue angle is the hue angle of a mixed color of the yellow ink composition and magenta ink composition.

41. The ink set according to claim 39, further comprising a violet ink composition whose hue angle is the hue angle of a mixed color of the magenta ink composition and cyan ink composition.

42. The ink set according to claim 39, further comprising a black ink composition.

43. A method for producing an inkjet record, comprising depositing the clear ink composition according to claim 1 or 17, and a colorant-containing color ink composition on a recording medium to form a record.

44. The method for producing an inkjet record according to claim 43, comprising ejecting the clear ink composition and the colorant-containing color ink composition during the same process.

45. The method for producing an inkjet record according to claim 43, comprising depositing the clear ink composition such that, in portions in which the duty of the color ink composition on the recording medium is equal to or less than the target duty value, the sum of the duty value of the color ink composition and the duty value of the clear ink composition is equal to or greater than the target duty value.

46. The method for producing an inkjet record according to claim 45, wherein the target duty value is 40%.

47. The method for producing an inkjet record according to claim 43, comprising depositing the clear ink composition in the regions of a recording medium surface at a constant duty value irrespective of the duties of the color ink composition on the recording medium.

48. The method for producing an inkjet record according to claim 43, comprising depositing the clear ink composition in the regions of a recording medium surface at a constant duty value of 20% or less irrespective of the duties of the color ink composition on the recording medium.

49. A record, on which recording is performed by the method for producing an inkjet record according to claim 43.

* * * * *